US007969593B2

(12) United States Patent
Toda

(10) Patent No.: US 7,969,593 B2
(45) Date of Patent: Jun. 28, 2011

(54) PRINTING APPARATUS, CONTROL METHOD THEREFOR, JOB PROCESSING METHOD, PRINTING SYSTEM, AND PROGRAM

(75) Inventor: Masayuki Toda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1029 days.

(21) Appl. No.: 11/510,602

(22) Filed: Aug. 28, 2006

(65) Prior Publication Data

US 2007/0046995 A1 Mar. 1, 2007

(30) Foreign Application Priority Data

Aug. 30, 2005 (JP) ................................. 2005-249947

(51) Int. Cl.
*G06F 3/12* (2006.01)
(52) U.S. Cl. ..................... 358/1.14; 358/1.13; 358/1.15; 358/1.16; 358/437
(58) Field of Classification Search ........ 358/1.13–1.18, 358/437
See application file for complete search history.

(56) References Cited

U.S. PATENT DOCUMENTS

| | | | | | |
|---|---|---|---|---|---|
| 4,858,171 | A | * | 8/1989 | Furusawa et al. | 715/210 |
| 5,323,212 | A | * | 6/1994 | Fukui | 399/14 |
| 5,995,723 | A | * | 11/1999 | Sperry et al. | 358/1.15 |
| 6,430,382 | B1 | | 8/2002 | Okamoto et al. | 399/82 |
| 6,606,163 | B1 | * | 8/2003 | Suzuki et al. | 358/1.15 |
| 6,796,730 | B2 | | 9/2004 | Toda et al. | 400/76 |
| 6,873,425 | B1 | | 3/2005 | Boyce | |
| 6,963,412 | B1 | | 11/2005 | Toda | 358/1.13 |
| 7,161,702 | B2 | | 1/2007 | Toda | 358/1.15 |
| 7,172,260 | B2 | * | 2/2007 | Yoshida et al. | 347/7 |
| 7,483,159 | B2 | * | 1/2009 | Tokutomo et al. | 358/1.15 |
| 2003/0002063 | A1 | | 1/2003 | Oomura et al. | 358/1.11 |
| 2003/0076525 | A1 | | 4/2003 | Hikawa | |
| 2003/0090696 | A1 | * | 5/2003 | Willis et al. | 358/1.14 |
| 2003/0122890 | A1 | | 7/2003 | Shimada | |
| 2003/0159114 | A1 | * | 8/2003 | Nishikawa et al. | 715/530 |
| 2003/0214667 | A1 | | 11/2003 | Ishikura | |
| 2004/0145772 | A1 | | 7/2004 | Stingham et al. | |
| 2004/0179230 | A1 | | 9/2004 | Kitada | |
| 2004/0213615 | A1 | * | 10/2004 | Nakao | 400/76 |
| 2005/0052679 | A1 | * | 3/2005 | Green et al. | 358/1.14 |
| 2005/0105117 | A1 | * | 5/2005 | Oh et al. | 358/1.13 |
| 2006/0017960 | A1 | * | 1/2006 | Kakigi | 358/1.14 |
| 2006/0133832 | A1 | * | 6/2006 | Watanabe et al. | 399/27 |

FOREIGN PATENT DOCUMENTS

| | | |
|---|---|---|
| CN | 1251928 | 5/2000 |
| CN | 1340757 | 3/2002 |
| EP | 996055 | 4/2000 |
| JP | 2001-096870 | 4/2001 |
| JP | 2001-195214 A | 7/2001 |

OTHER PUBLICATIONS

Chinese Office Action dated Jul. 24, 2009 in Chinese counterpart Application No. 200610115198.3.
U.S. Appl. No. 11/683,320 (Toda), filed Mar. 7, 2007.
U.S. Appl. No. 11/683,346 (Toda), filed Mar. 7, 2007.
U.S. Appl. No. 11/510,807 (Toda), filed Aug. 28, 2006.

* cited by examiner

*Primary Examiner* — Chan S Park
(74) *Attorney, Agent, or Firm* — Fitzpatrick, Cella, Harper & Scinto

(57) ABSTRACT

Print data is input from an external device, and the input print data is analyzed. The print data is temporarily saved in a holding unit on the basis of the analysis result to interrupt a printing process for the print data and start the printing process for another print data.

8 Claims, 21 Drawing Sheets

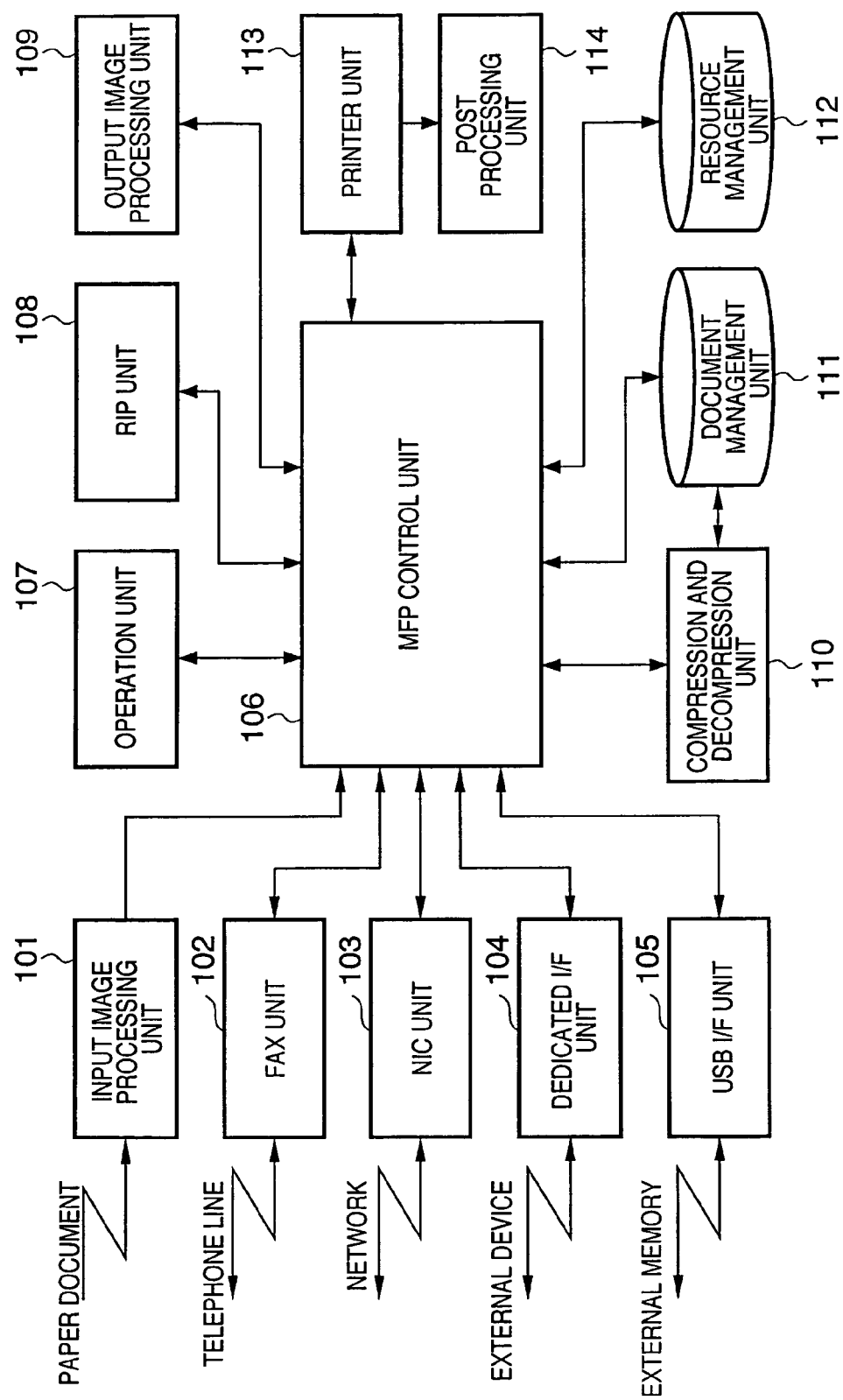

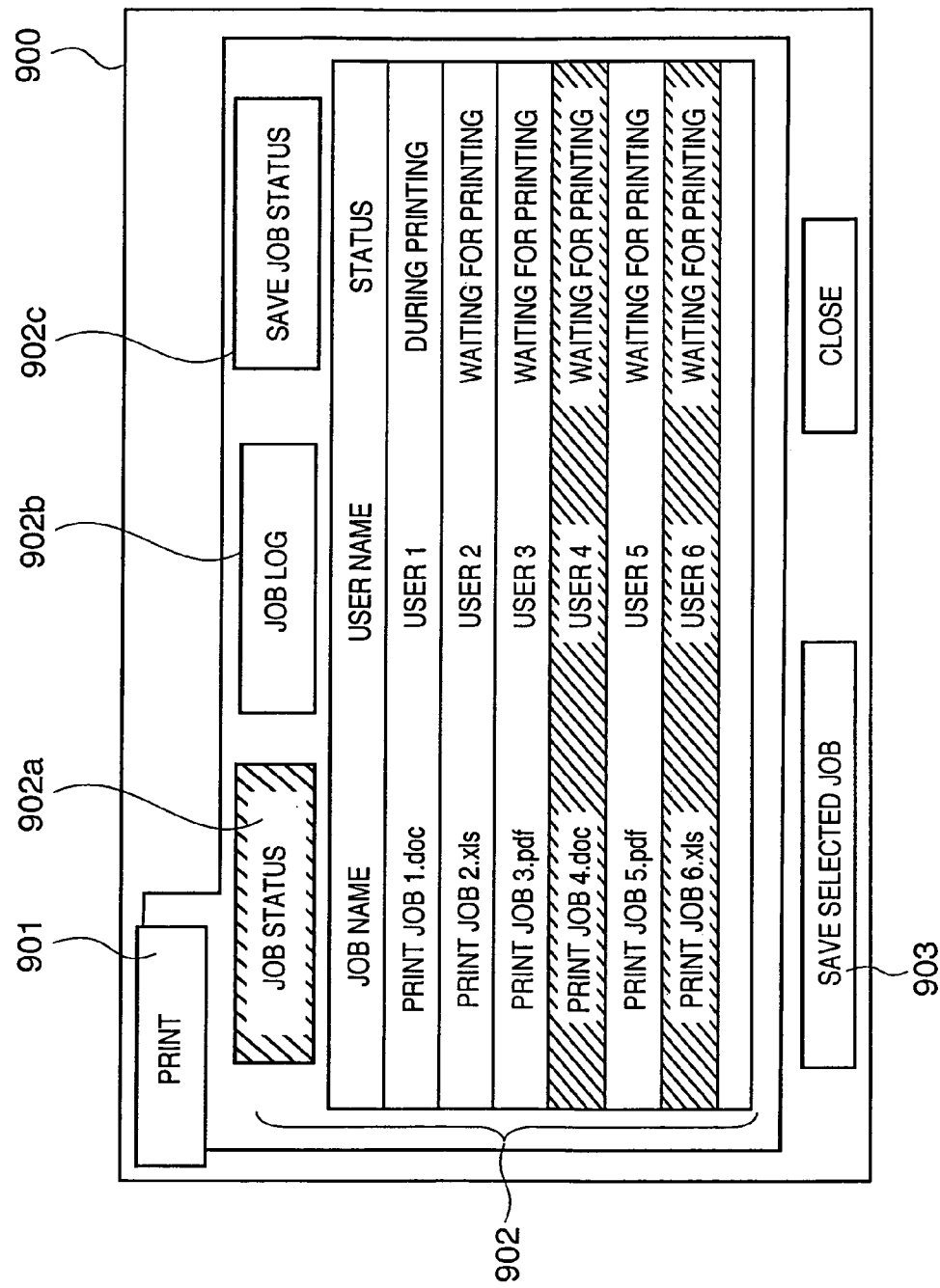

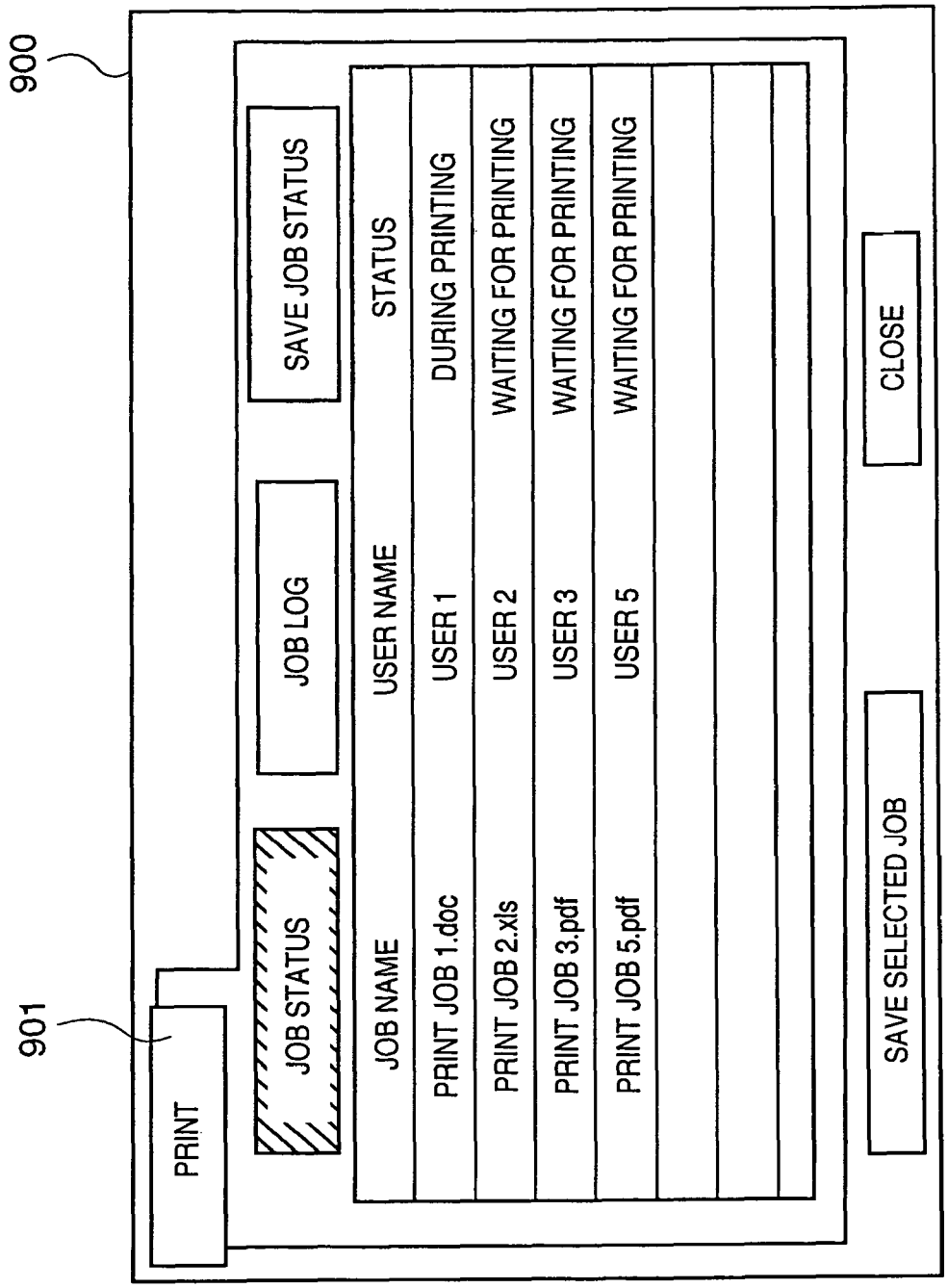

PRINTING APPARATUS, CONTROL METHOD THEREFOR, JOB PROCESSING METHOD, PRINTING SYSTEM, AND PROGRAM

BACKGROUND OF THE INVENTION

1. Field of the Invention

The present invention relates to a printing apparatus which prints on the basis of print data, a control method therefor, and a program.

2. Description of the Related Art

In the commercial printing industry, a third party (customer or client) places an order to create a printed product (e.g., magazine, newspaper, brochure, advertisement, or gravure), and a printed product desired by the client is created. The printed product is delivered to the client to get the fee from the client. Even now, the commercial printing industry mainly uses large-scale printing apparatuses such as an offset reproduction printing press.

In the commercial printing industry, work proceeds through various processes. The processes include, for example, entry, design & layout, comprehensive layout (presentation using a printer output), proofreading (layout correction and color correction), proof (proof print), block copy preparation, printing, post process, and shipping. When the above-mentioned printing press is used, a block copy must be prepared. Once the block copy is prepared, it is difficult and disadvantageous in cost to correct the block copy. This problem arises from the fact that careful proofreading, i.e., layout check and color confirmation are indispensable.

As described above, in this industry, large-scale apparatuses are needed, and a long time is taken to create a printed product desired by a client. Work operations require expert knowledge and know-how of experts called craftsmen.

Nowadays, with the advent of high-speed and high-quality electrophotographic and inkjet printing apparatuses, a print-on-demand business category is present against the conventional printing industry. Print-on-demand will be abbreviated as POD hereinafter.

The POD intends to group jobs handled by a printing apparatus into jobs of relatively small lots and print the jobs in a short delivery period without using any large-scale apparatus or system. The POD implements digital printing using electronic data by making the best of digital image forming apparatuses such as a digital copying machine and digital multi-function peripheral. The POD market of the POD business category is being developed. In this POD market, printing is merged with digitization more than in the conventional printing industry, and management and control using computers become widespread. By utilizing the computers, POD printing is coming close to a given level of the printing industry.

In this background, the POD market provides PFP which is a printing service for a copy/print shop, and CRD which is an in-house printing service. The PFP stands for Print For Pay, and the CRD stands for Centralized Reproduction Department.

The advantages of the PFP and CRD are a lower cost and shorter delivery period in comparison with offset printing. In the POD market, it is important how to shorten the downtime of the printing apparatus and increase the printing productivity. In the POD market, a dedicated operator often performs a printing process.

A configuration for increasing the printing productivity is disclosed in, e.g., Japanese Patent Application Laid-Open No. 2001-96870. In Japanese Patent Application Laid-Open No. 2001-96870, when job A having no stapling instruction and job B having a stapling instruction are successively processed, an initial operation on stapling of subsequent job B is executed parallel to a process for preceding job A. The parallel operation shortens the process of job B after the process of job A.

In Japanese Patent Application Laid-Open No. 2001-96870, it is examined to increase the productivity of a plurality of jobs by the system.

In a printing environment such as the POD environment, it is an important factor for a business chance how to efficiently process many print jobs in order to meet various requests from various users (clients). It is desired to provide a convenient, user-friendly printing system capable of flexibly coping with this situation. For this purpose, examinations should be made on the assumption of an operation environment, practices, needs, and the like at an actual site.

Assume that a print job of many pages is requested from the customer or many jobs are processed. In this situation, the working efficiency may decrease if the operator always monitors the printing apparatus until all print jobs are completed. At the work site, therefore, it is expected that the operator moves away from the printing apparatus and performs another work even during printing by the apparatus. At this time, if an error factor such as absence of print sheets or absence of toner used for printing occurs in the printing apparatus, it is expected that the printing apparatus temporarily interrupts the printing process.

Assume that a subsequent print job waits after the interrupted print job in this situation, and the subsequent job is free from any printing interruption factor. Even in this situation, it is expected that processes for all print jobs by the printing apparatus stop due to the error factor generated in the current print job. In this case, the printing process of the printing apparatus may stop until the operator cancels the error factor or printing of the print job is canceled. As a result, the productivity of print jobs may be influenced in the whole system.

SUMMARY OF THE INVENTION

The present invention has been made to overcome the conventional drawbacks. It is an object of the present invention to make it possible to efficiently continue a printing process even when an error occurs in a printing apparatus.

For example, the present invention is not limited to merely a configuration of processing a job efficiently when viewed from the apparatus or system. In other words, it is preferable to provide a mechanism capable of processing a plurality of jobs by scheduling convenient to even an operator who operates the apparatus and system, while achieving high productivity even when an error factor is generated in the printing apparatus. It is desired that a system capable of flexibly meeting various needs from various users can be constructed in accordance with an actual site such as the POD environment.

According to the present invention, the foregoing object is attained by providing a printing apparatus which prints on the basis of print data, comprising:

an input unit adapted to input print data from an external device;

an analysis unit adapted to analyze the print data input from the input unit;

a holding unit adapted to hold data; and a print control unit adapted to temporarily save the print data in the holding unit on the basis of an analysis result by the analysis unit, interrupt a printing process for the print data, and start the printing process for another print data.

In a preferred embodiment, the apparatus further comprises a status management unit adapted to manage a status of the printing apparatus, wherein when a resource necessary to print the print data is not contained in resources which are managed by the status management unit and set in the printing apparatus, as a result of analyzing the print data by the analysis unit, the print control unit temporarily saves the print data in the holding unit, interrupts the printing process for the print data, and starts the printing process for another print data.

In a preferred embodiment, the apparatus further comprises further comprising a save condition setting unit adapted to make save condition setting for save in the holding unit, wherein the print control unit temporarily saves the print data in the holding unit on the basis of the analysis result by the analysis unit and a setting content of the save condition setting, interrupts the printing process for the print data, and starts the printing process for another print data.

In a preferred embodiment, when a resource necessary to print the print data saved in the holding unit is detected by the status management unit, the print control unit restores the printing process for the print data.

In a preferred embodiment, the apparatus further comprising a restore condition setting unit adapted to make restore condition setting for restoring the printing process for the print data when a resource necessary to print the print data saved in the holding unit is detected by the status management unit.

In a preferred embodiment, the apparatus further comprising an instruction unit adapted to designate restore to the printing process for the print data when a resource necessary to print the print data saved in the holding unit is detected by the status management unit.

In a preferred embodiment, the apparatus further comprising a restore method designation unit adapted to designate a restore method for restore designated by the instruction unit, wherein the print control unit restores the printing process for the print data saved in the holding unit on the basis of the restore method designated by the restore method designation unit.

In a preferred embodiment, the apparatus further comprising:

a list display unit adapted to display a list of print data during printing and in wait for printing; and a display control unit adapted to display print data in the list so as to discriminate the print data from another printable print data when a resource necessary to print the print data is not contained in resources which are managed by the status management unit and set in the printing apparatus, as a result of analyzing the print data by the analysis unit.

In a preferred embodiment, the apparatus further comprising a display setting unit adapted to set a display method for print data displayed in the list by the list display unit.

In a preferred embodiment, the apparatus further comprising:

a selection unit adapted to select arbitrary print data displayed in the list by the list display unit; and a save unit adapted to save the print data selected by the selection unit in the holding unit.

In a preferred embodiment, the apparatus further comprising:

a save print data list display unit adapted to display a save print data list of save print data saved in the holding unit; and a restore instruction unit adapted to designate restore of the printing process for, among print data in the save print data list, print data for which a resource necessary to print the print data is detected by the status management unit.

According to the present invention, the foregoing object is attained by providing a method of controlling a printing apparatus which prints on the basis of print data, comprising the steps of:

inputting print data from an external device;

analyzing the input print data; and temporarily saving the print data in a holding unit on the basis of an analysis result to interrupt a printing process for the print data and start the printing process for another print data.

According to the present invention, the foregoing object is attained by providing a program stored in a computer-readable storage medium, for causing a computer to control a printing apparatus which prints on the basis of print data, causing the computer to input print data from an external device;

analyze the input print data; and temporarily save the print data in a holding unit on the basis of an analysis result, interrupt a printing process for the print data, and start the printing process for another print data.

According to the present invention, the foregoing object is attained by providing a job processing method suitable for a system having a printing apparatus capable of accepting a plurality of jobs, comprising allowing the printing apparatus to execute, at a timing based on a user instruction input via a user interface unit, a printing process for a job which waits for the printing process due to an interruption factor generated in the printing apparatus.

According to the present invention, the foregoing object is attained by providing a job processing method suitable for a system having a printing apparatus capable of accepting a plurality of jobs, comprising allowing the printing apparatus to execute, at a timing based on a user instruction, a printing process for a job designated by a user among a plurality of jobs which wait for the printing process due to an interruption factor generated in the printing apparatus.

According to the present invention, the foregoing object is attained by providing a job processing method suitable for a system having a printing apparatus capable of accepting a plurality of jobs, comprising allowing the printing apparatus to successively execute, at a timing based on a user instruction, a printing process at once for a plurality of jobs designated by a user among a plurality of jobs which wait for the printing process due to an interruption factor generated in the printing apparatus.

According to the present invention, even a situation assumed in Description of the Related Art can be coped with. For example, even when an error occurs in the printing apparatus, the printing apparatus can efficiently continue a printing process. The present invention is not limited to merely a configuration of processing a job efficiently when viewed from the apparatus or system, and can achieve high productivity even if an error factor is generated in the printing apparatus. In addition, a plurality of jobs can be processed by scheduling convenient to even the operator who operates the apparatus and system. The present invention can construct a convenient, user-friendly system environment in which various needs from various users can be flexibly met in accordance with an actual site such as the POD environment.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 1B is a block diagram showing the arrangement of an MFP according to the embodiment of the present invention;

FIGS. 9A and 9B are views showing an example of a job status window according to the embodiment of the present invention;

DESCRIPTION OF THE EMBODIMENT

A preferred embodiment of the present invention will be described in detail in accordance with the accompanying drawings.

[Overall Configuration]

Figure 1A:
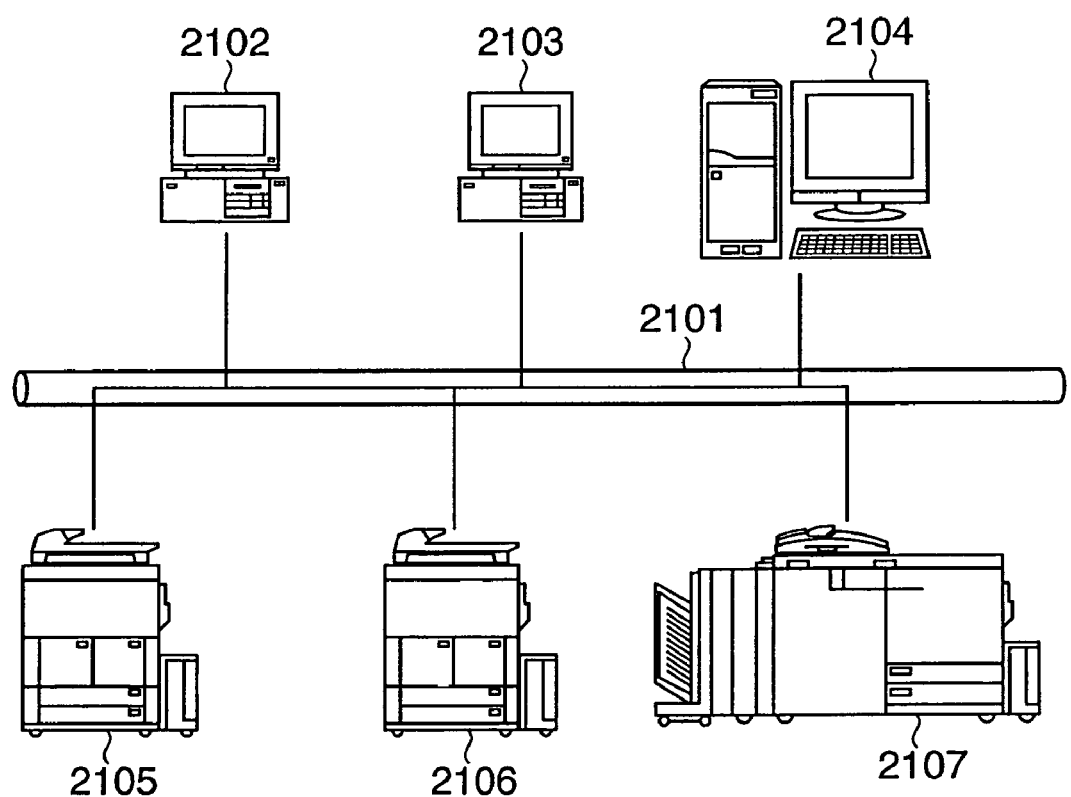
FIG. 1A is a schematic view showing an image forming system according to an embodiment of the present invention.

FIG. 1A is a schematic view showing an image forming system according to the embodiment of the present invention.

Personal computers (PCs) 2102 to 2104, and MFPs (Multi Function Peripherals) 2105 to 2107 functioning as image forming apparatuses are connected to a network 2101. Although not shown in FIG. 1A, other PCs or MFPs can also be connected in addition to the PCs 2102 to 2104 and the MFPs 2105 to 2107.

The PCs 2102 to 2104 will be typified by the PC, whereas the MFPs 2105 to 2107 will be typified by the MFP. The PC has standard building components (e.g., a CPU, RAM, ROM, hard disk, external storage, network interface, display, keyboard, and mouse) which are mounted in a general-purpose computer.

[Arrangement of MFP]

The arrangement of the MFP will be explained with reference to FIG. 1B.

FIG. 1B is a block diagram showing the arrangement of the MFP according to the embodiment of the present invention.

The MFP incorporates a storage device such as a hard disk capable of storing data of a plurality of jobs (job data). The MFP has a copying function of printing job data output from a scanner by the printing unit via the storage device. The MFP has a printing function of printing job data output from an external device such as a PC by the printer unit via the storage device. In this manner, the MFP has a plurality of functions including these functions.

MFPs are classified into full-color MFPs and monochrome MFPs. In many cases, the full-color MFP includes the arrangement of the monochrome MFP at the basic part except the color processing function, internal data, and the like. Thus, only the full-color MFP will be explained, and a description of the monochrome MFP will be added, as needed.

The image forming system may comprise a multi-function type image forming apparatus having a plurality of functions, and an SFP which is a single-function type image forming apparatus having only the printing function. Alternatively, the image forming system may comprise an image forming apparatus of either type. The image forming system may comprise a plurality of image forming apparatuses of either type. In any case, the image forming system is configured to implement control according to the embodiment.

Note that the SFP stands for Single Function Peripheral.

As shown in FIG. 1B, the MFP comprises an input image processing unit 101 which reads an image of a paper document or the like and processes the read image data, and a FAX unit 102 which is typified by a facsimile machine or the like and transmits/receives an image using a telephone line. The MFP comprises a NIC (Network Interface Card) unit 103 which transmits/receives image data and apparatus information to/from an external device such as a PC using the network 2101.

The MFP comprises a dedicated interface (I/F) unit 104 which exchanges information such as image data with an external device. The MFP also comprises a USB (Universal Serial Bus) interface (USB I/F) unit 105 which exchanges data such as image data with a USB device typified by a USB memory (kind of removable medium).

The input image processing unit 101 is implemented by, e.g., a scanner having an ADF (Auto Document Feeder).

An MFP control unit 106 controls various processes such as a process of temporarily saving image data in accordance with the application purpose of the MFP and a process of determining a data transfer path.

A document management unit 111 is implemented by a storage device such as a hard disk capable of storing a plurality of image data. Image data of a plurality of types can be stored in the document management unit 111 mainly by the control unit (e.g., the CPU and memory (RAM or ROM) of the MFP control unit 106) of the image forming apparatus.

Image data of a plurality of types include image data from the input image processing unit 101. These image data also include image data of a facsimile job input via the FAX unit 102. The image data further include image data input from an external device via the NIC unit 103, dedicated I/F unit 104, and USB I/F unit 105.

The MFP control unit 106 controls to read out image data stored in the document management unit 111, as needed, transfer the image data to an output unit such as a printer unit 113, and execute an output process such as a printing process by the printer unit 113. The MFP control unit 106 controls to transfer or distributedly transfer image data read out from the document management unit 111 to at least one external device such as a PC or another image forming apparatus via the network 2101 in accordance with an instruction from the operator.

The MFP control unit 106 performs, via a compression and decompression unit 110, a process of compressing and storing image data, as needed, in storing the image data in the document management unit 111, and a process of decompressing compressed/stored image data into original image data in reading out the image data. It is generally known that data compressed by JPEG, JBIG, ZIP, or the like is used when data is transferred through the network 2101. After such data is input to the MFP, it is decompressed by the compression and decompression unit 110.

A resource management unit 112 stores data such as various parameter tables (e.g., the font, color profile, and gamma table) which are commonly used in various image processes. These data can be called, as needed. In addition, a new parameter table can be stored, and the parameter table can be corrected and updated.

When PDL data is input to the MFP control unit 106, it undergoes a RIP process by a RIP unit 108. If necessary, an image to be printed undergoes an image process for printing by an output image processing unit 109. If necessary, intermediate data of image data generated at this time, and print ready data (bitmap data for printing or compressed data of the bitmap data) can also be stored again in the document management unit 111.

Note that the PDL stands for Page Description Language. The RIP stands for Raster Image Processor.

Image data having undergone various processes is transmitted to the printer unit 113 which forms an image. A sheet printed out from the printer unit 113 is fed into a post processing unit 114, which performs a print sheet sorting process and print sheet finishing process.

The MFP control unit 106 plays a role of smoothly flowing a job. In order to execute the following functions A) to N) in accordance with operation contents to the MFP, the MFP control unit 106 controls switching of the processing path of building components in the MFP.

It is generally known to store image data as intermediate data, as needed. However, a description of accesses except those which start and end in the document management unit 111 will be omitted. A flow will be roughly described by omitting processes by the compression and decompression unit 110 and post processing unit 114 which are used as needed, those by the MFP control unit 106 serving as the core of the whole system, and the like.

A) Copying function: the input image processing unit 101→the output image processing unit 109→the printer unit 113

B) Facsimile transmission function: the input image processing unit 101→the FAX unit 102

C) Facsimile reception function: the FAX unit 102→the output image processing unit 109→the printer unit 113

D) Network scan: the input image processing unit 101→the NIC unit 103

E) Network printing: the NIC unit 103→the RIP unit 108→the output image processing unit 109→the printer unit 113

F) Scan to external device: the input image processing unit 101→the dedicated I/F unit 104

G) Printing from external device: the dedicated I/F unit 104→the RIP unit 108→the output image processing unit 109→the printer unit 113

H) Scan to external memory: the input image processing unit 101→the USB I/F unit 105

I) Printing from external memory: the USB I/F unit 105→the RIP unit 108→the output image processing unit 109→the printer unit 113

J) Box scan function: the input image processing unit 101→the output image processing unit 109→the document management unit 111

K) Box printing function: the document management unit 111→the printer unit 113

L) Box reception function: the NIC unit 103→the RIP unit 108→the output image processing unit 109→the document management unit 111

M) Box transmission function: the document management unit 111→the NIC unit 103

N) Preview function: the document management unit 111→an operation unit 107

In addition to the above functions, combinations with various functions such as an E-mail service and Web server function are conceivable, but a description thereof will be omitted.

Of the above functions A) to N), J) box scan function, K) box printing function, L) box reception function, or M) box transmission function is an MFP processing function accompanying write and read of data using the document management unit 111. These processing functions are to divide the storage area in the document management unit 111 for respective jobs and respective users, temporarily save data, and input/output data in combination with a user ID and password.

The operation unit 107 is used to select various flows and functions described above and designate an operation. With the high-resolution display device of the operation unit 107, for example, a process of previewing image data stored in the document management unit 111, and if the image data is checked "OK", printing the image data can also be implemented.

The detailed arrangement of the MFP control unit 106 will be explained with reference to FIG. 2.

Figure 2:
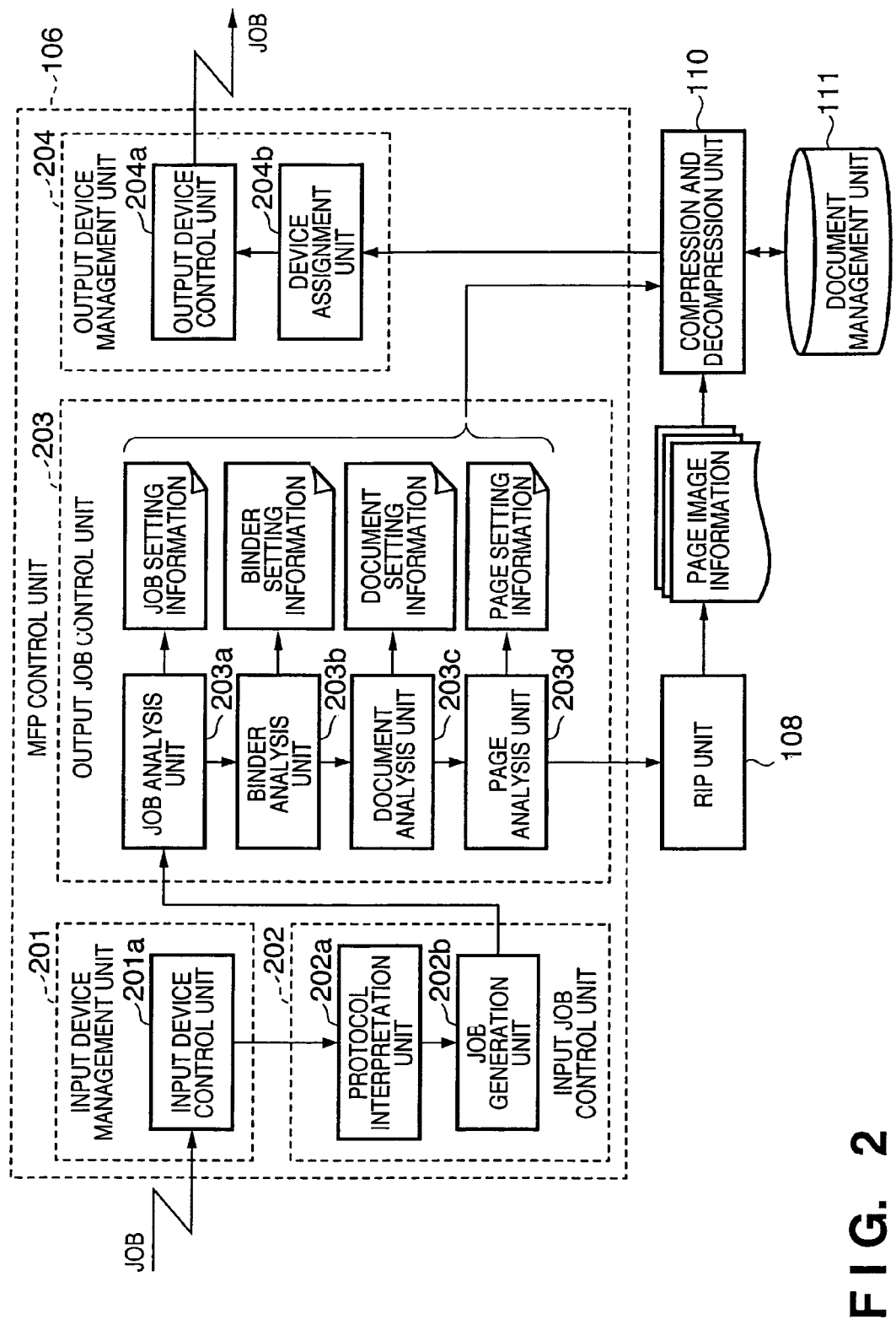
FIG. 2 is a block diagram showing the detailed arrangement of an MFP control unit according to the embodiment of the present invention.

FIG. 2 is a block diagram showing the detailed arrangement of the MFP control unit according to the embodiment of the present invention.

The detailed arrangement of the MFP control unit shown in FIG. 2 is made up of mainly four parts: an input device management unit 201 which manages an input device, an input job control unit 202 which interprets an input job, an output job control unit 203 which arranges various types of setting information on a job, and an output device management unit 204 which assigns an output device.

The input device management unit 201 plays a role of arranging input signals from input units (input devices) of the MFP in FIG. 1B, and determining the switching order. The input units are various building components which are connected to the MFP control unit 106 and input signals to the MFP control unit 106.

The input device management unit 201 comprises an input device control unit 201a which receives input signals via the respective input units. The input signals include signals input from outside the MFP such as a scan image signal of a paper document and PDL data from the network. In addition, the input signals include image data stored in the document management unit 111, and image data which are processed in cooperation with the RIP unit 108 and output image processing unit 109.

The input job control unit 202 comprises a protocol interpretation unit 202a and job generation unit 202b. A series of operation requests sent from the input device control unit 201a are instruction signals called commands (protocols), which are received by the input job control unit 202. The protocol interpretation unit 202a interprets an outline of operation requests, and converts it into operation procedures which can be understood in the MFP.

The job generation unit 202b generates various jobs such as a print job, scan job, PDL expansion job, and FAX reception job on the basis of the interpretation results of the protocol interpretation unit 202a. For each generated job, a scenario representing what kind of process is performed in the MFP and where data is to be sent is defined. The job flows in the MFP in accordance with the scenario.

In the output job control unit 203, image information, and various types of setting information (generally called job tickets) on a job are created by a job analysis unit 203a, binder analysis unit 203b, document analysis unit 203c, and page analysis unit 203d.

The job analysis unit 203a analyzes details of setting information (job setting information) on an entire job, such as the name of a document to be printed, the number of print copies, designation of a delivery tray serving as an output destination, and the binder order of a job made up of a plurality of binders. The binder analysis unit 203b analyzes details of setting information (binder setting information) on an entire binder, such as setting of the bookbinding method, the stapling position, the document order of a binder made up of a plurality of documents.

The document analysis unit 203c analyzes details of setting information (document setting information) on an entire document, such as the page order of a document made up of a plurality of pages, designation of double-sided printing, and addition of a cover sheet or slip sheet. The page analysis unit 203d analyzes details of setting information (page setting information) on various setting pages, such as the image resolution and image orientation (landscape/portrait). When PDL data is input, the RIP unit 108 is called to perform a rasterization process. In generating image information, the RIP unit 108 is called to generate page image information in the rasterization process. The page image information is compressed by the compression and decompression unit 110, and stored in the document management unit 111 in association with various types of setting information.

The output device management unit 204 comprises an output device control unit 204a and device assignment unit 204b. Page image information saved in the document management unit 111 is decompressed by the compression and decompression unit 110, and read out together with various types of setting information associated with the page image information. Various types of setting information and page image information are transmitted in pairs to the output device management unit 204.

The device assignment unit 204b plays a role of arbitrating contention because contention occurs between output units (output devices) when a plurality of jobs perform their processes at the same time in assigning output devices on the basis of the defined scenarios of the respective jobs. The output device control unit 204a schedules output units such as the printer unit 113 and post processing unit 114 for use.

As an example of the MFP, the structure of a 4D color MFP will be explained with reference to FIG. 3.

Figure 3:
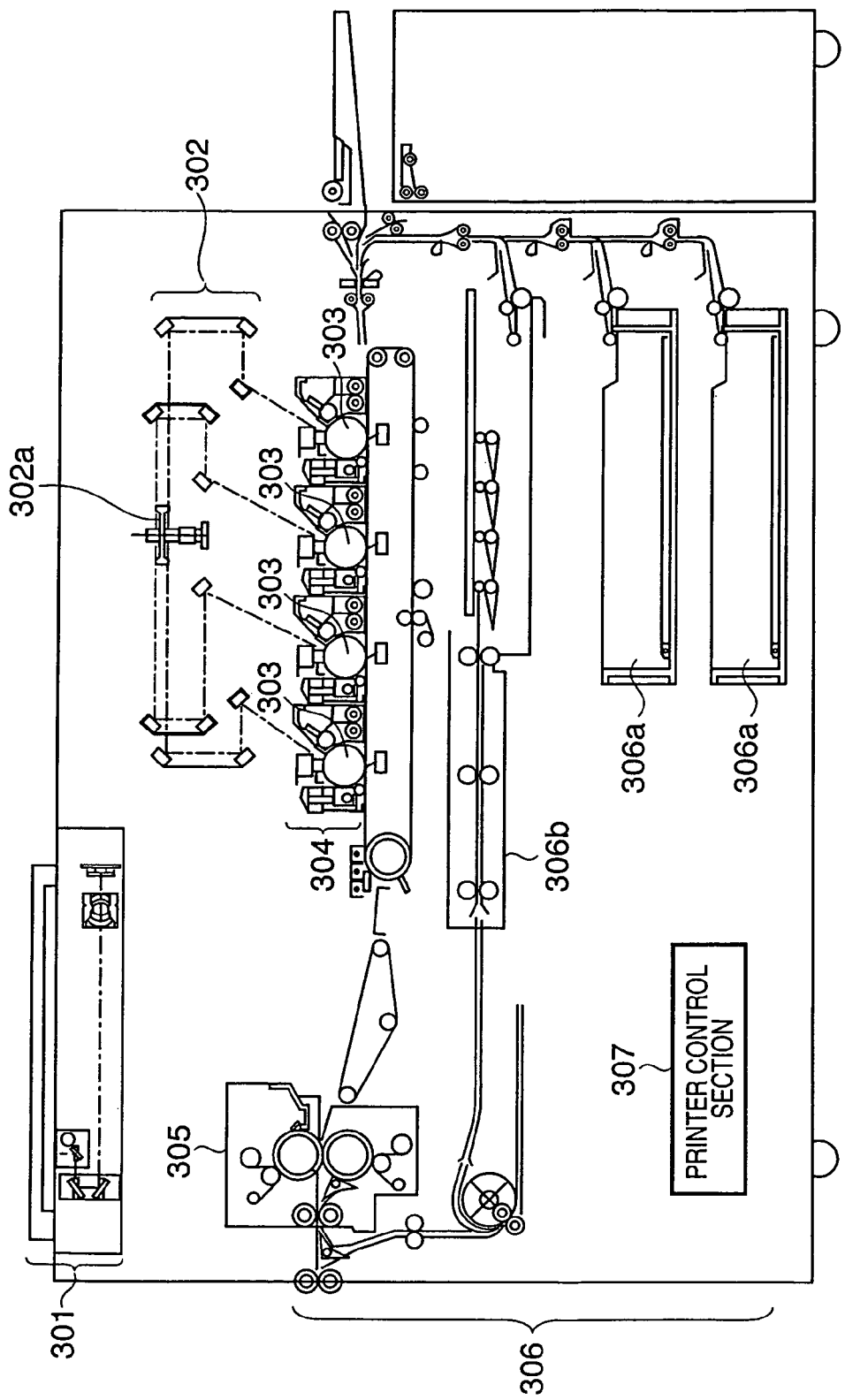
FIG. 3 is a sectional view showing the structure of a 4D color MFP according to the embodiment of the present invention.

FIG. 3 is a sectional view showing the structure of the 4D color MFP according to the embodiment of the present invention.

The 4D color MFP implements color printing using printing agents (e.g., toners) of four colors: cyan (C), magenta (M), yellow (Y), and black (K). The 4D color MFP is mainly formed from a scanner section 301, a laser exposure section 302, photosensitive drums 303, an image forming section 304, a fixing section 305, a sheet feed/convey section 306, and a printer control section 307 which controls these sections.

The scanner section 301 illuminates a document set on a document table optically scans the document image, and converts the image into an electrical signal to create image data. The laser exposure section 302 emits a light ray such as a laser beam modulated in accordance with image data to a rotary polygon mirror 302a which rotates at an equiangular velocity. Then, the laser exposure section 302 irradiates the photosensitive drum 303 with the light ray as reflected scanning light.

The image forming section 304 is implemented by arranging four developing units (developing stations) for a series of electrophotographic processes. The series of electrophotographic processes includes a process of driving and rotating the photosensitive drum 303, charging it by a charger, and developing with toner a latent image formed on the photosensitive drum 303 by the laser exposure section 302. The series of electrophotographic processes also includes a process of transferring the toner image onto a print sheet (also called a sheet), and recovering a small amount of toner which is not transferred and remains on the photosensitive drum 303.

The four developing units which are arranged in an order of cyan (C), magenta (M), yellow (Y), and black (K) execute an image forming operation sequentially by the magenta, yellow, and black developing units a predetermined time after the start of image formation by the cyan developing unit. Under the timing control, a full-color toner image is transferred onto a sheet without any color misregistration.

The fixing section 305 is formed from a combination of rollers and belts. The fixing section 305 incorporates a heat source such as a halogen heater, and fuses and fixes by heat and pressure the toner on the sheet on which the toner image is transferred by the image forming section 304.

The sheet feed/convey section 306 has at least one sheet stocker 306a typified by a sheet cassette or paper deck. The sheet feed/convey section 306 separates one of sheets stored in the sheet stocker 306a in accordance with an instruction from the printer control section 307, and conveys the sheet to the image forming section 304 and fixing section 305. Toner images of the respective colors are transferred onto the conveyed sheet by the above-described developing units, finally forming a full-color toner image on the sheet. To form images on the two sides of the sheet, the sheet having passed through the fixing section 305 is controlled to pass through a double-sided convey path 306b extending to the image forming section 304.

The printer control section 307 communicates with the MFP control unit 106 (FIG. 1) for controlling the whole MFP, and executes control in accordance with an instruction from the MFP control unit 106. Also, while the printer control section 307 manages the statuses of the scanner section 301, laser exposure section 302, image forming section 304, fixing section 305, and sheet feed/convey section 306, it instructs them to keep the balance and operate smoothly.

The sheet having passed through the fixing section 305 passes through an image reading sensor unit on the convey path, and the image reading sensor unit reads image data printed on the sheet. The read image data is used for, e.g., measurement of the density of an output image and checking to confirm whether the output image is normal.

The detailed arrangement of the RIP unit 108 will be described with reference to FIG. 4.

Figure 4:
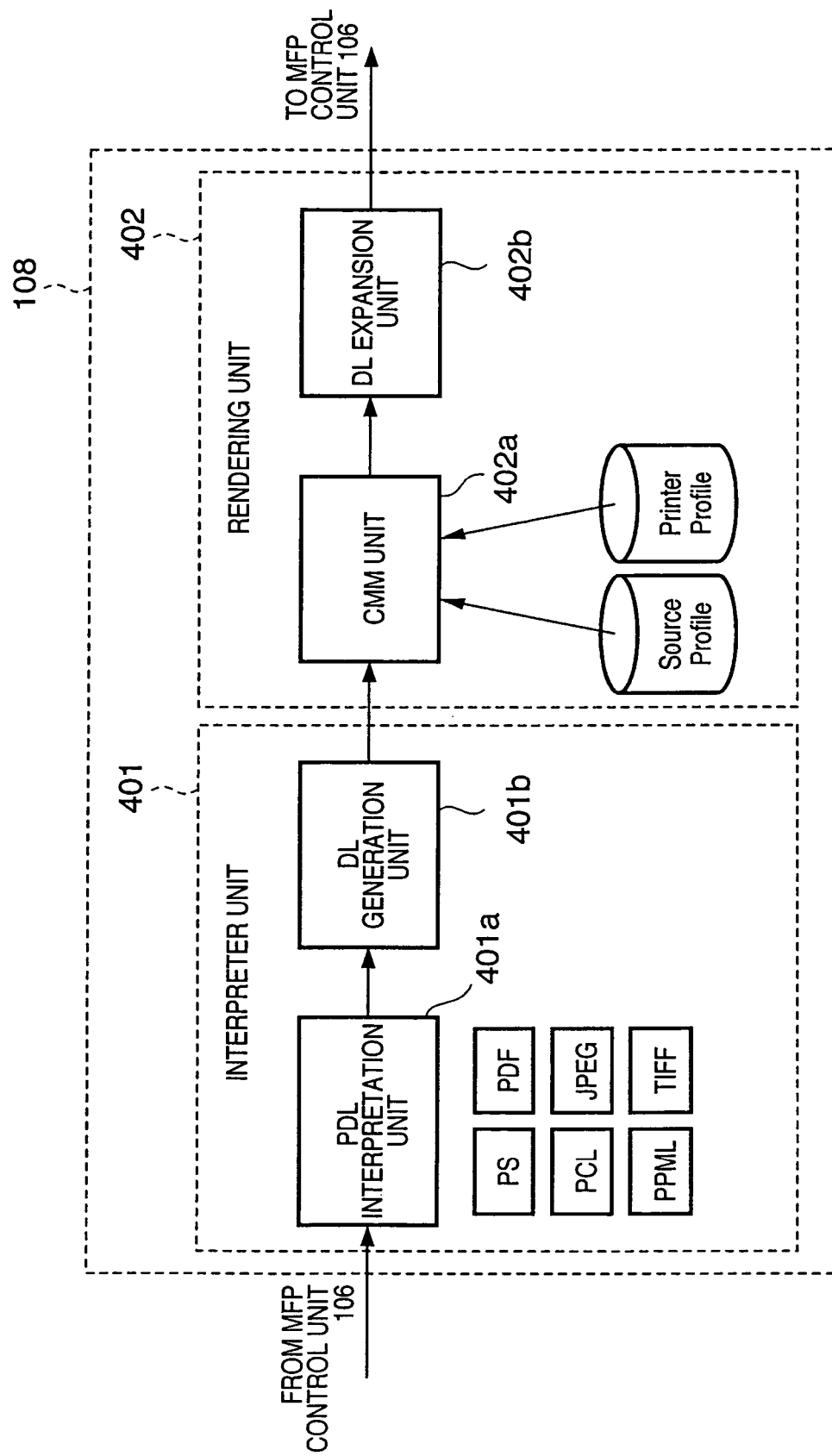
FIG. 4 is a block diagram showing the detailed arrangement of a RIP unit according to the embodiment of the present invention.

FIG. 4 is a block diagram showing the detailed arrangement of the RIP unit according to the embodiment of the present invention.

The RIP is a processor for simultaneously reproducing vector information (e.g., a character, line art, or figure) described in PDL, and object information such as image scan line information (e.g., a color, pattern, or photo) on a page. More specifically, the RIP bitmaps each object image (into a raster image) in the memory. The RIP has conventionally been mounted as hardware on the output device side, but at present, can be implemented by software along with an increase in CPU speed.

The RIP unit 108 is generally formed from two parts: an interpreter unit 401 and rendering unit 402. The interpreter unit 401 is made up of a PDL interpretation unit 401a which interprets PDL data, and a DL (Display List) generation unit 401b which generates an intermediate file called a display list from the interpreted PDL data.

The rendering unit 402 is made up of a CMM unit 402a which performs color matching for the display list, and a DL expansion unit 402b which expands the display list into a bitmap (raster image).

Note that the CMM stands for Color Matching Module.

The PDL interpretation unit 401a interprets various types of input PDL data. As the input format of the PDL data, the Postscript® language available from Adobe, and the PCL (Printer Control Language) language available from HP (Hewlett-Packard) are well known. According to these languages, PDL data are described by printer control codes for creating an image of each page. The printer control codes include a picture drawing code and photographic image code in addition to a simple character code.

The PDF (Portable Document Format) which is a document display file format developed by Adobe is also frequently used in various fields. The PDL interpretation unit 401a targets even data of this format which is directly input to the MFP without using any driver.

In addition, a VDP (Variable Data Print) format called PPML (Personalized Print Markup Language) is available. The PDL interpretation unit 401a also copes with color image compression formats such as JPEG. (Joint Photographic Experts Group) and TIFF (Tagged Image File Format).

The CMM unit 402a can receive various image data expressed in general color spaces such as grayscale, RGG, and CMYK. For data in another color space, the CMM unit 402a converts the data into the CMYK space using CRD (Color Rendering Dictionary), and performs color matching. The CMM unit 402a adjusts the color on the basis of the ICC profile.

The ICC profile has a source profile and printer profile.

The source profile is used to temporarily convert RGM (or CMYK) data into the standardized L*a*b* space, and convert the L*a*b* space again into the CMYK space suited to a target printer. At this time, the source profile is made up of an RGB profile and CMYK profile. When the input image is an RGB-based image (e.g., JPEG image, TIFF image, or an image by application software available from Microsoft), the RGB profile is selected. When the input image is a CMYK-based image (e.g., partial data by Photoshop or Illustrator available from Adobe), the CMYK profile is selected.

The printer profile is generated in accordance with the color characteristic of each printer. For an RGB-based image, Perceptual (color tint priority) or Saturation (definition priority) is preferably selected. For a CMYK-based image, Colorimetric (minimum color difference) is often selected to output an optimal image.

The ICC profile is generally formed in the lookup table form. According to the source profile, when RGB (or CMYK) data is input, it is uniquely converted into L*a*b* data. To the contrary, according to the printer profile, L*a*b* data is converted into CMYK data which matches the printer.

Note that RGB data which does not require color matching is converted into CMYK data by default color conversion, outputting the CMYK data. CMYK data which does not require color matching is directly output.

Image data expanded by the RIP unit 108 is held in the document management unit 111 via the compression and decompression unit 110.

The detailed arrangement of the output image processing unit 109 will be described with reference to FIG. 5.

Figure 5:
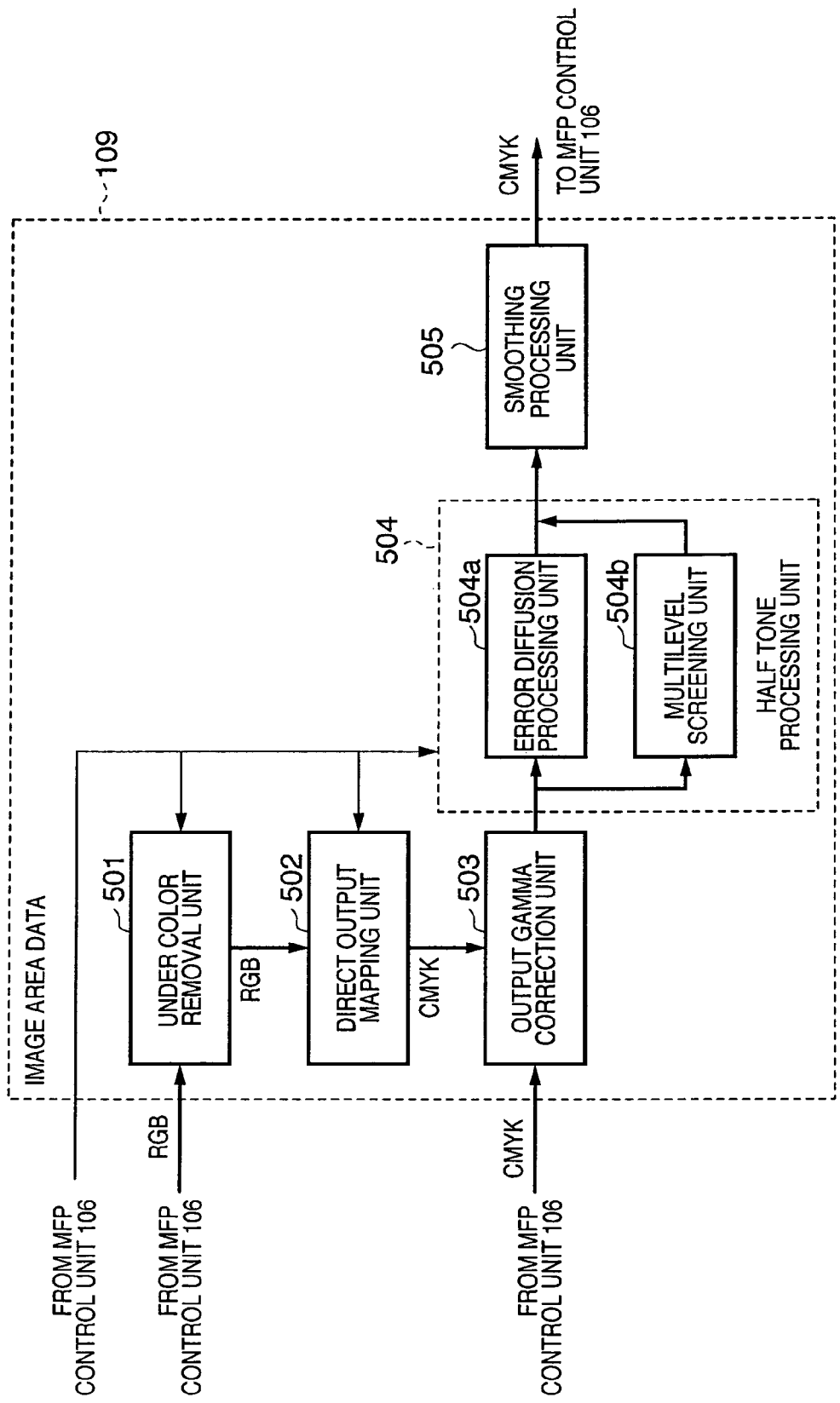
FIG. 5 is a block diagram showing the detailed arrangement of an output image processing unit according to the embodiment of the present invention.

FIG. 5 is a block diagram showing the detailed arrangement of the output image processing unit according to the embodiment of the present invention.

Image data input to the output image processing unit 109 (color system) are mainly classified into RGB-based data for processing data output from the input image processing unit 101 for a copying operation and the like, and CMYK-based data for processing data output from the RIP unit 108 for a network printing operation and the like.

Image data is input to an under color removal unit 501 in the former case, and to an output gamma correction unit 503 in the latter case.

The under color removal unit 501 executes nonlinear transformation for removing the under color from input RGB image data. A direct output mapping unit 502 converts the RGB image data into CMYK image data. In conversion, the R, G, and B values are input to the lookup table, and a C (Cyan) component is generated from the sum of the output values. Similarly, M (Magenta), Y (Yellow), and K (blacK) components are generated by the add operation on the basis of the lookup table. At this time, a three-dimensional lookup table is used on the basis of the image area data (data containing a text area, photo area, and the like obtained by an image area process) detected by the input image processing unit 101. In particular, lookup tables of different types are applied to the text area and photo area.

The output gamma correction unit 503 corrects the density of an output image in correspondence with the output unit (e.g., the printer unit 113). By using one-dimensional lookup tables for C, M, Y, and K, the output gamma correction unit 503 plays a role of maintaining the linearity of output image data that changes every image formation. The result of color calibration is reflected in the lookup table.

A half tone processing unit 504 can alternatively apply screening of a different type in accordance with the MFP function. Generally in a copying operation and the-like, screening by an error diffusion processing unit 504a that hardly causes moire is utilized. In a printing operation, screening by a multilevel screening unit 504b using a dither matrix or the like is often adopted in consideration of the reproducibility of characters and thin lines.

The former method is to weight a pixel of interest and surrounding pixels by an error filter, and distribute and correct a multilevel error while maintaining the number of tones. The latter method is to set the threshold of the dither matrix to a multilevel value, and express a pseudo half tone. According to this method, C, M, Y, and K are independently converted, and low and high LPIs (Line Per Inches) are switched depending on input image data to reproduce the image.

A smoothing processing unit 505 detects an edge for each of C, M, Y, and K by pattern matching, and converts the image into a pattern to be reproduced more smoothly, thereby reducing jaggies.

An example of the operation unit 107 will be explained with reference to FIG. 6.

Figure 6:
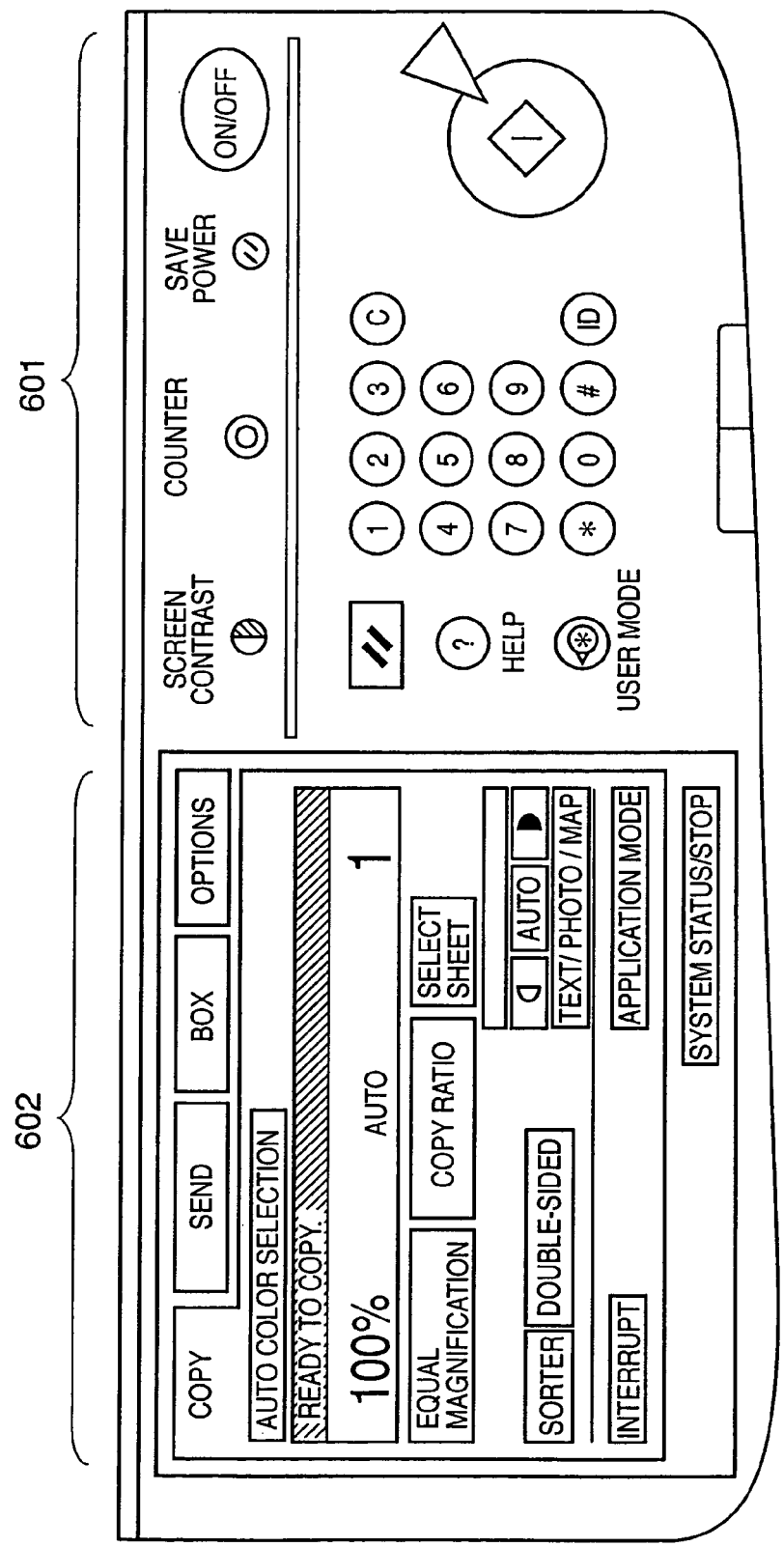
FIG. 6 is a view showing an example of an operation unit according to the embodiment of the present invention.

FIG. 6 is a view showing an example of the operation unit according to the embodiment of the present invention.

The operation unit 107 comprises a key input section 601 and touch panel section 602. Details of the key input unit 601 and touch panel section 602 are shown in FIGS. 7 and 8, and will be described below.

Figure 7:
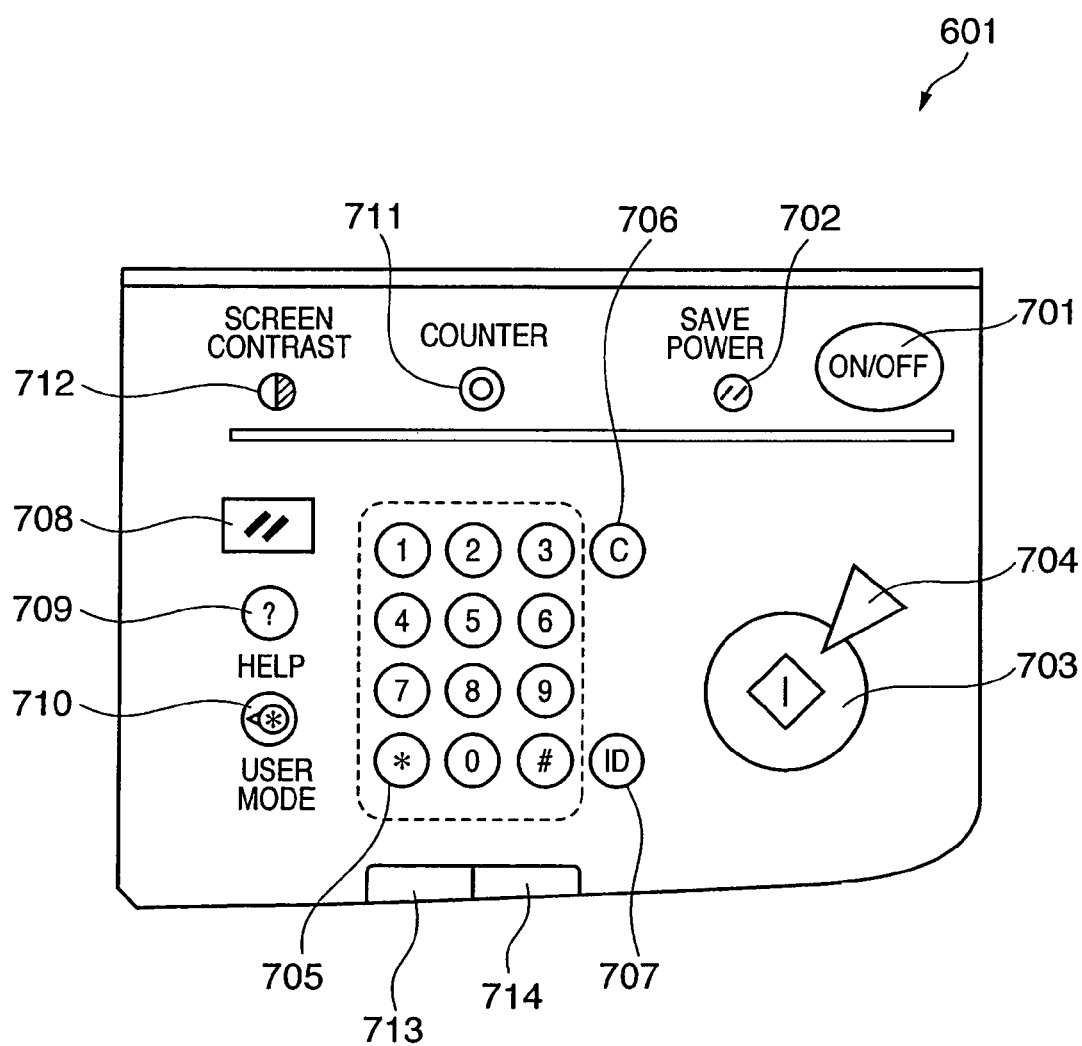
FIG. 7 is a view showing an example of a key input section according to the embodiment of the present invention.
Figure 8:
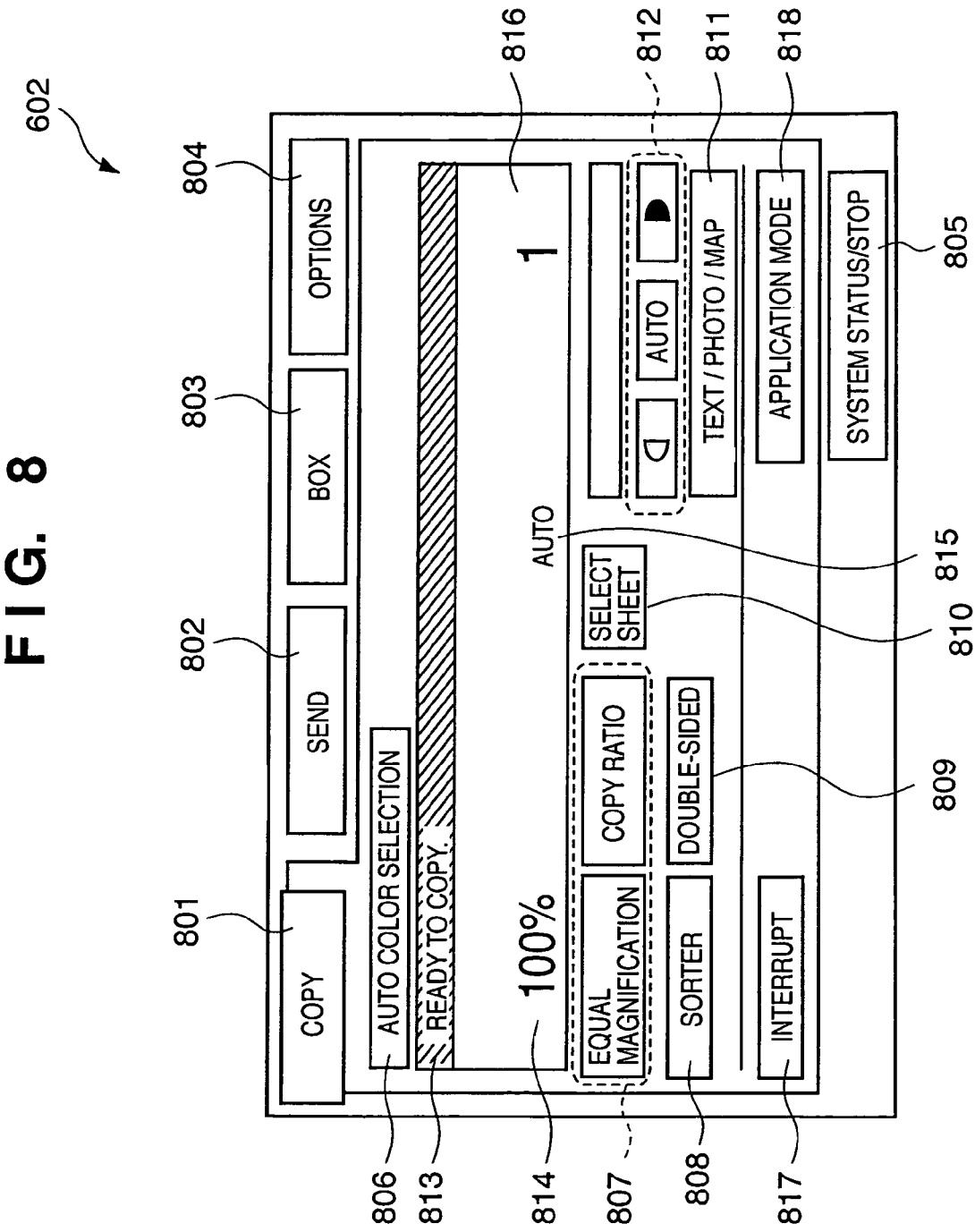
FIG. 8 is a view showing an example of a touch panel section according to the embodiment of the present invention.

The key input section 601 shown in FIG. 7 is a key input part capable of making stationary operation settings.

An operation unit power switch 701 switches between the standby mode (normal operation state) and the sleep mode (state in which the main controller stops the program while waiting for an interrupt by network printing, facsimile transmission, or the like, and suppresses power consumption). With the operation unit power switch 701, the main power switch for supplying power to the whole system can be controlled ON.

A power save key 702 is used to decrease the control temperature of the fixing section 305 (FIG. 3) in the standby mode and suppress power consumption though a long time is taken until the current state changes to a printable one. The control temperature can also be decreased by setting the power saving ratio.

A start key 703 is used to designate the start of various processes such as copying and transmission. A stop key 704 is used to interrupt the start of various processes.

A ten-key pad 705 is used to input the entries of various settings. A clear key 706 is used to cancel the entries. An ID key 707 is used to input a preset password in order to authenticate the operator of the MFP.

A reset key 708 is used to invalidate various settings and restore to default settings. A help key 709 is used to display guidance and help. A user mode key 710 is used to shift to a system setup window for each user.

A counter check key 711 is used to display an output sheet count stored in a software counter which is arranged in the MFP and counts the number of print sheets. The counter check key 711 can display an output sheet count in accordance with each of the operation mode (e.g., copy/print/scan/FAX), the color mode (e.g., color/monochrome), and the sheet size (e.g., large/small).

An image contrast dial 712 is used to adjust the screen to an easy-to-see state by controlling the backlight of the liquid crystal display of the touch panel section 602.

An execution/memory lamp 713 flickers to notify the operator of execution of a job or access to the memory. An error lamp 714 flickers upon a failure in executing a job, or an error requiring a serviceman call, or for an operator call to notify the operator of a jam, absence of consumables, or the like.

The touch panel section 602 shown in FIG. 8 is made up of an LCD (Liquid Crystal Display), and a touch panel display which is adhered onto the LCD and formed from a transparent electrode. A process of, e.g., when a transparent electrode at a portion corresponding to a key displayed on the LCD is touched with a finger, detecting the touch and displaying another operation window is programmed in advance. FIG. 8 shows an initial window in the standby mode, and various operation windows can be displayed in accordance with setting operations.

A copy tab 801 is a tab key for changing to an operation window for a copying operation. A send tab 802 is a tab key for changing to an operation window for designating a send operation such as FAX transmission or E-mail sending. A box tab 803 is a tab key for changing to an operation window for inputting/outputting a job to/from a box (storage means for storing a job for each user). An option tab 804 is a tab key for changing to a setting window for setting extended functions such as scanner setting and printer setting. By selecting these tabs, the touch panel section 602 can change to corresponding operation modes.

A system monitor key 805 is used to display the state and status of the MFP. A color selection setting key 806 is used to select color copying, monochrome copying, or auto selection in advance. A copy ratio setting key 807 is used to change to a copy ratio setting window for setting a copying ratio such as equal magnification, enlargement, or reduction. A post process setting key 808 is used to change to a post process setting window for setting whether to perform stapling or punching, the number of staples or punches, the position of the staple or punch, and the like.

A double-sided setting key 809 is used to change to a double-sided setting window for selecting single- or double-sided printing. A sheet size setting key 810 is used to change to a sheet size setting window for selecting a sheet feed stage, sheet size, and medium type. An image mode setting key 811 is used to select an image mode (e.g., text or image mode) suitable for reading of a document image. A density setting key 812 is used to adjust the density of an output image to be high or low.

A status display portion 813 provides simple status display such as standby, warm-up, jam, or error. A copy ratio display portion 814 displays a copy ratio set with the copy ratio setting key 807. A sheet size display portion 815 displays a sheet size and medium type set with the sheet size setting key 810. A sheet count display portion 816 displays a sheet count designated with the ten-key pad 705, or the number of a sheet during printing in process.

An interrupt key 817 is used when another job interrupts a copying operation. An application mode key 818 is used to change to a setting window for setting various image processes and layouts, such as two-page separation, cover sheet/slip sheet setting, reduction layout, and image movement.

A job status window for a job during printing or in wait for printing will be explained with reference to FIGS. 9A and 9B.

FIGS. 9A and 9B are views showing an example of the job status window according to the embodiment of the present invention.

When the option tab 804 in the touch panel section 602 in FIG. 8 is selected, a job status window 900 (FIG. 9A) having a print tab 901 for setting a printing operation by the printer is displayed. The job status window 900 displays a job list 902 of jobs after printing, during printing, in wait for printing, and during save. Job information on a job including the job name, user name, and status is displayed for each job.

The job list 902 has a job status button 902a, job log button 902b, and save job status button 902c. When the job status button 902a is operated, the job list 902 displays job information on a job during printing or in wait for printing. When the job log button 902b is operated, the job list 902 displays job information on a printed job. When the save job status button 902c is operated, the job list displays job information on a job during save. Details of a job during save (save job) will be described later.

The display state in FIG. 9A shows a case where the job status button 902a is operated.

In FIG. 9A, two jobs "print job 4.doc" and "print job 6.xls" in the job list 902 are displayed (highlighted) in a list background color different from that of the remaining jobs. The different background color shows that resources for executing printing run short at the current settings of the printing apparatus. Alternatively, the different background color shows that conditions set by display setting (to be described later) coincide with conditions for printing the job.

If a "save selected job" button 903 is operated while these two jobs are selected, the two jobs are temporarily moved and held as save jobs in the document management unit 111 (FIG. 2). FIG. 9B shows the job status window 900 after the two jobs are saved as save jobs with the "save selected job" button 903 in FIG. 9A.

Note that resources for executing printing mean various resources necessary to print by the MFP. For example, the resources are the print sheet (including a print size and sheet type) used for printing, the printing agent (toner), the post processing function (e.g., punching or stapling), and the memory capacity.

Control in the printing apparatus when a job is saved and restored will be explained with reference to FIGS. 1B and 2.

Job setting information of a job input to the output job control unit 203 is analyzed by the job analysis unit 203a. The job is processed by the binder analysis unit 203b, document analysis unit 203c, and page analysis unit 203d, and then sent to the RIP unit 108.

Image data which is expanded by the RIP unit 108 is compressed by the compression and decompression unit 110, and held in the document management unit 111. Before the start of printing, the MFP control unit 106 confirms whether the printing apparatus status managed by the resource management unit 112 is set as resources necessary for settings represented by the job setting information analyzed by the job analysis unit 203a.

Note that the printing apparatus status includes the size and type of a print sheet set in the sheet stocker, and the mounting state of an optional device.

When printing can start, the job held in the document management unit 111 is decompressed by the compression and decompression unit 110, and printing is controlled by the output device management unit 204. If it is determined that necessary resources run short during printing and printing cannot continue, the print job is temporarily saved in the document management unit 111 under the control of the MFP control unit 106. When there is a subsequent printable job which waits for printing, a printing process for the job starts.

The resource management unit 112 always monitors the printing apparatus status. When the resource management unit 112 determines that resources necessary for the job temporarily saved in the document management unit 111 are set, the MFP control unit 106 resumes printing of the job.

A window (user mode setting window) for making display setting of the job status window 900 displayed in the touch panel section 602, save condition setting to temporarily save a job, and restore condition setting to resume printing of a job will be explained with reference to FIGS. 10A and 10B.

Figure 10A:
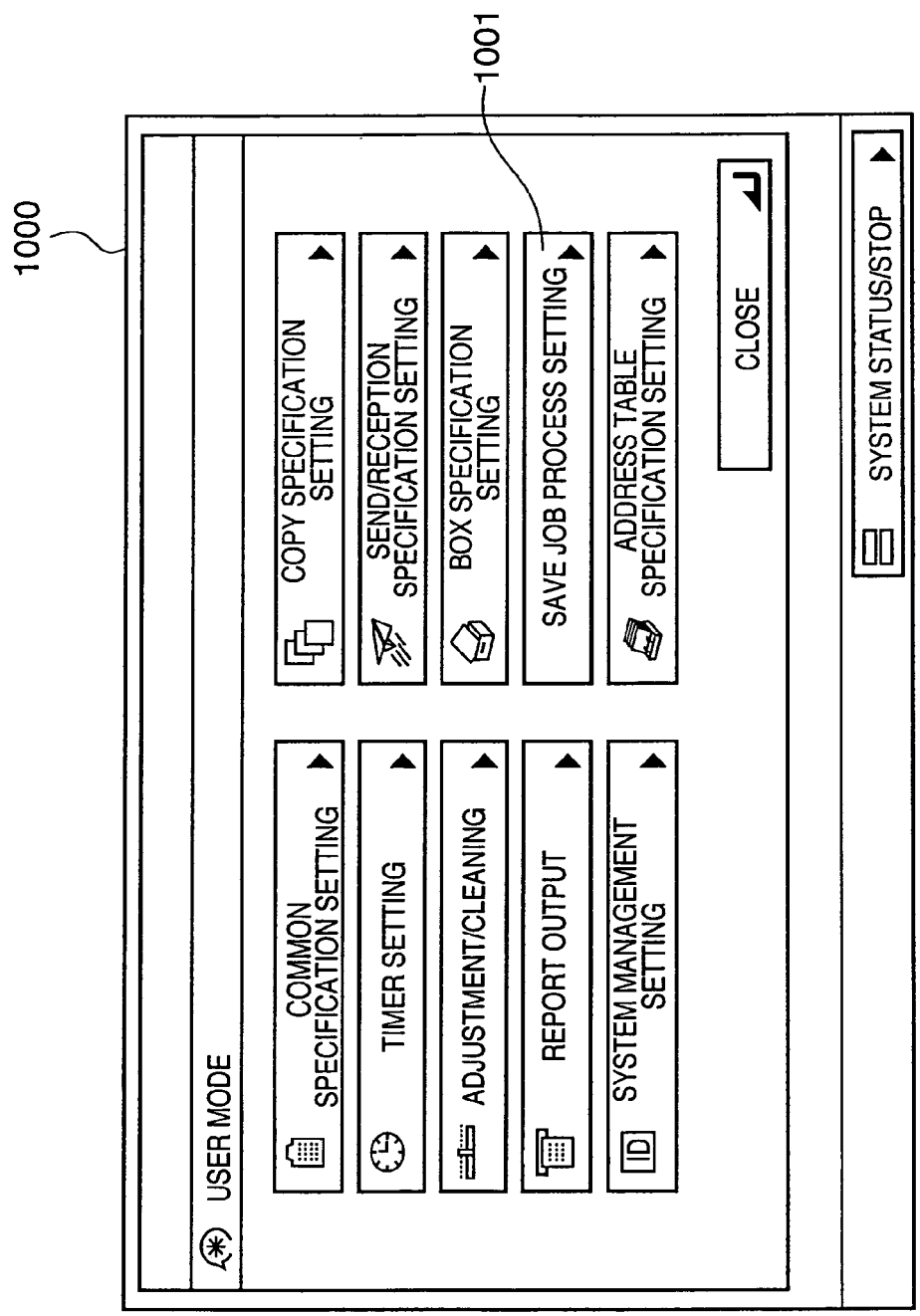
FIGS. 10A and 10B are views showing an example of a user mode setting window according to the embodiment of the present invention.
Figure 10B:
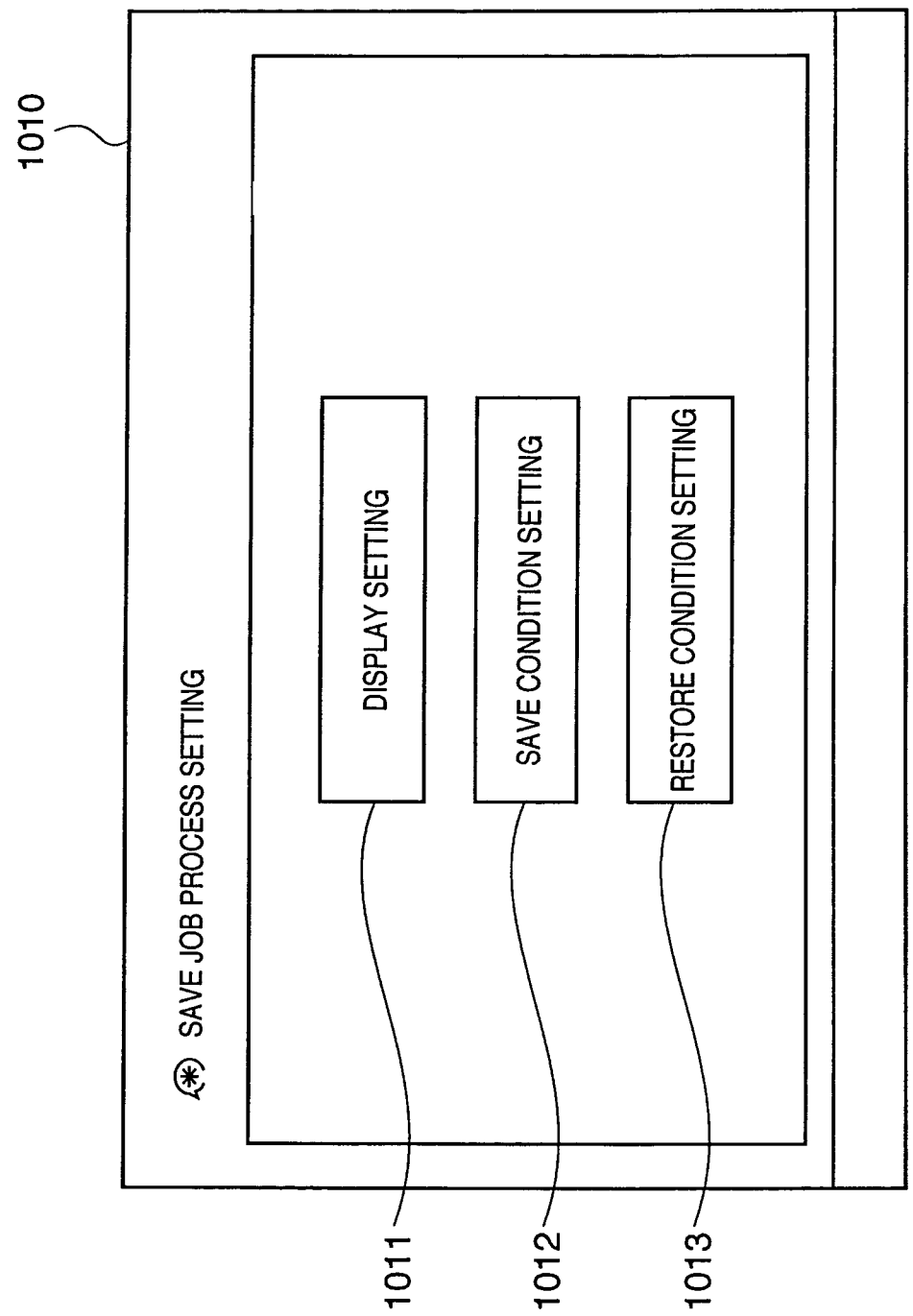

FIGS. 10A and 10B are views showing an example of the user mode setting window according to the embodiment of the present invention.

A user mode setting window 1000 shown in FIG. 10A is displayed when the user mode key 710 in the key input section 601 of FIG. 7 is pressed. The user mode setting window 1000 is equipped with buttons for making various settings on the MFP. These buttons include, for example, a common specification setting button, a timer setting button, a copy specification setting button, and a save job process setting button 1001.

If the save job process setting button 1001 is pressed, a save job process setting window 1010 shown in FIG. 10B is displayed. The save job process setting window 1010 includes a display setting button 1011, save condition setting button 1012, and restore condition setting button 1013.

Figure 11:
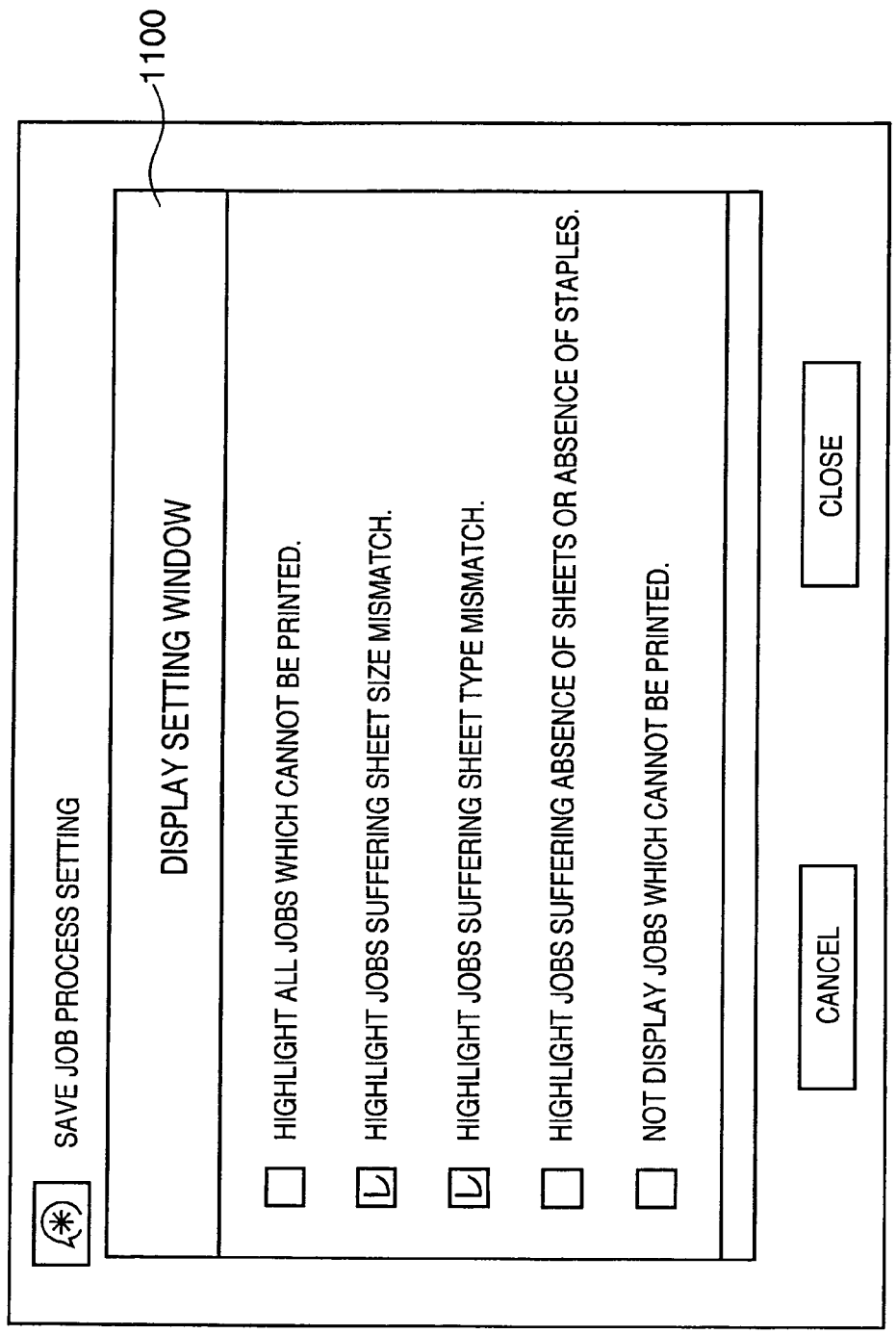
FIG. 11 is a view showing an example of a display setting window according to the embodiment of the present invention.

If the display setting button 1011 is pressed in the save job process setting window 1010, a display setting window 1100 shown in FIG. 11 is displayed. The display setting window 1100 allows making detailed settings of the display method of the job list 902 displayed in the job status window 900 (FIG. 9A).

A plurality of setting items are prepared as setting items of the display setting window 1100, and each setting item can be selected with a check box control. That is, an arbitrary combination of setting items can be simultaneously set with check box controls.

As shown in FIG. 11, an example of the setting items is "highlight all jobs which cannot be printed." Highlighting means that a job corresponding to the contents of the setting item among jobs in the job list 902 of FIG. 9A is discriminated from the remaining jobs. Hence, the display form is not limited to highlighting as far as a target job can be discriminated from the remaining jobs. For example, another display form such as blinking display or color-coding display can also be employed.

In FIG. 11, setting items for highlighting a job when only a specific condition such as the sheet size, the sheet type, and absence of staples is satisfied are prepared in addition to the setting item "highlight all jobs which cannot be printed." These setting items are merely examples, and various setting items can be prepared in accordance with the application purpose.

Figure 12:
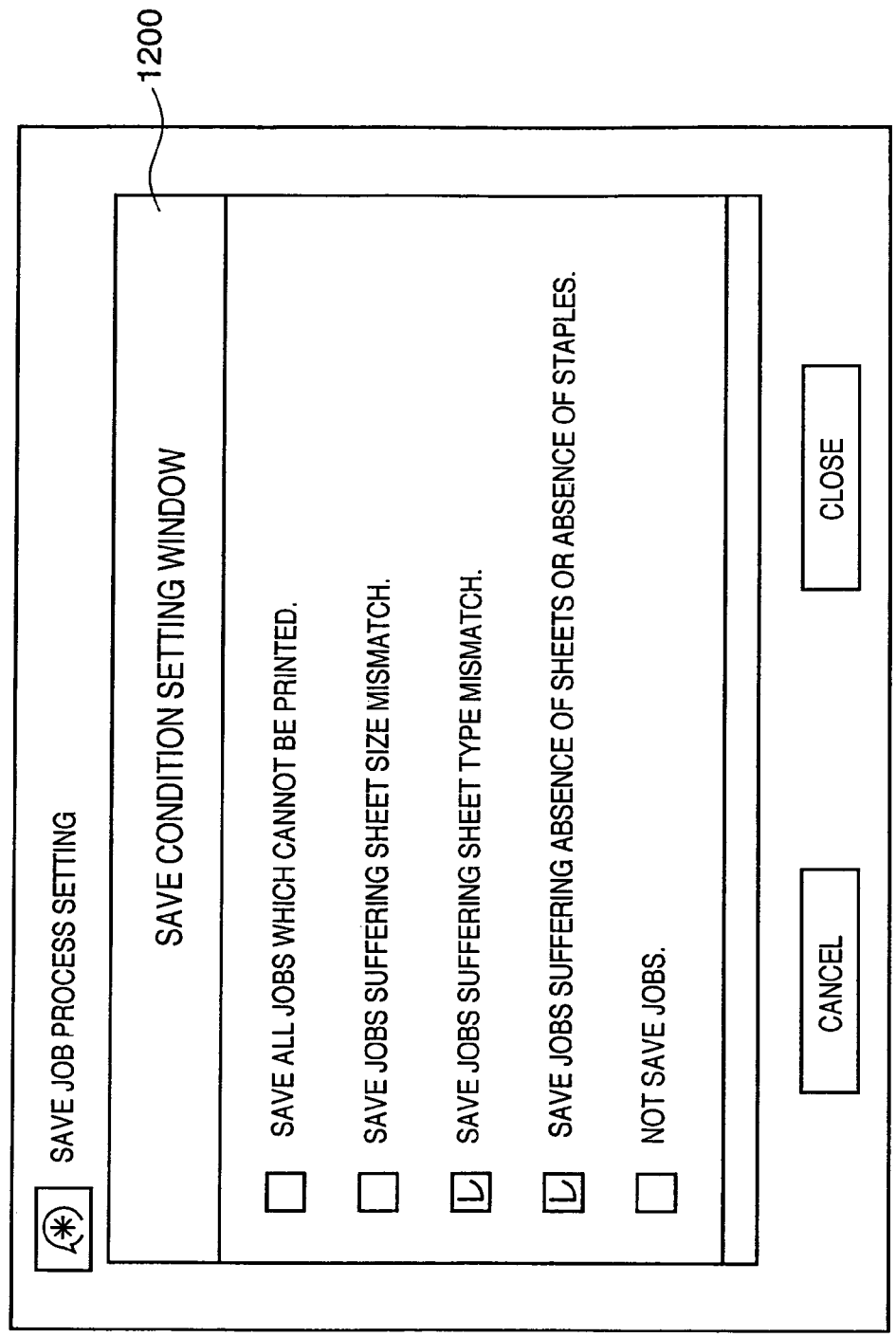
FIG. 12 is a view showing an example of a save condition setting window according to the embodiment of the present invention.

When the save condition setting button 1012 is pressed in the save job process setting window 1010, a save condition setting window 1200 shown in FIG. 12 is displayed. The save condition setting window 1200 allows setting whether to temporarily save a job due to a printing interruption cause when printing of the job cannot start or continue.

A plurality of setting items are prepared as setting items of the save condition setting window 1200, and each setting item can be selected with a check box control. That is, an arbitrary combination of setting items can be simultaneously set with check box controls.

As shown in FIG. 12, an example of the setting items is "save all jobs which cannot be printed." Save means that a job corresponding to the contents of the setting item among jobs in the job list 902 of FIG. 9A is saved in the document management unit 111 when the save job status button 902c is operated. Save also means that, when there is a subsequent job which waits for printing, a process for the job starts. The job saved in the document management unit 111 is managed in a save job list.

In FIG. 12, setting items for temporarily saving a job in the document management unit 111 when only a specific condition such as the sheet size, the sheet type, and absence of sheets is satisfied are prepared in addition to the setting item "save all jobs which cannot be printed." These setting items are merely examples, and various setting items can be prepared in accordance with the application purpose.

Figure 13:
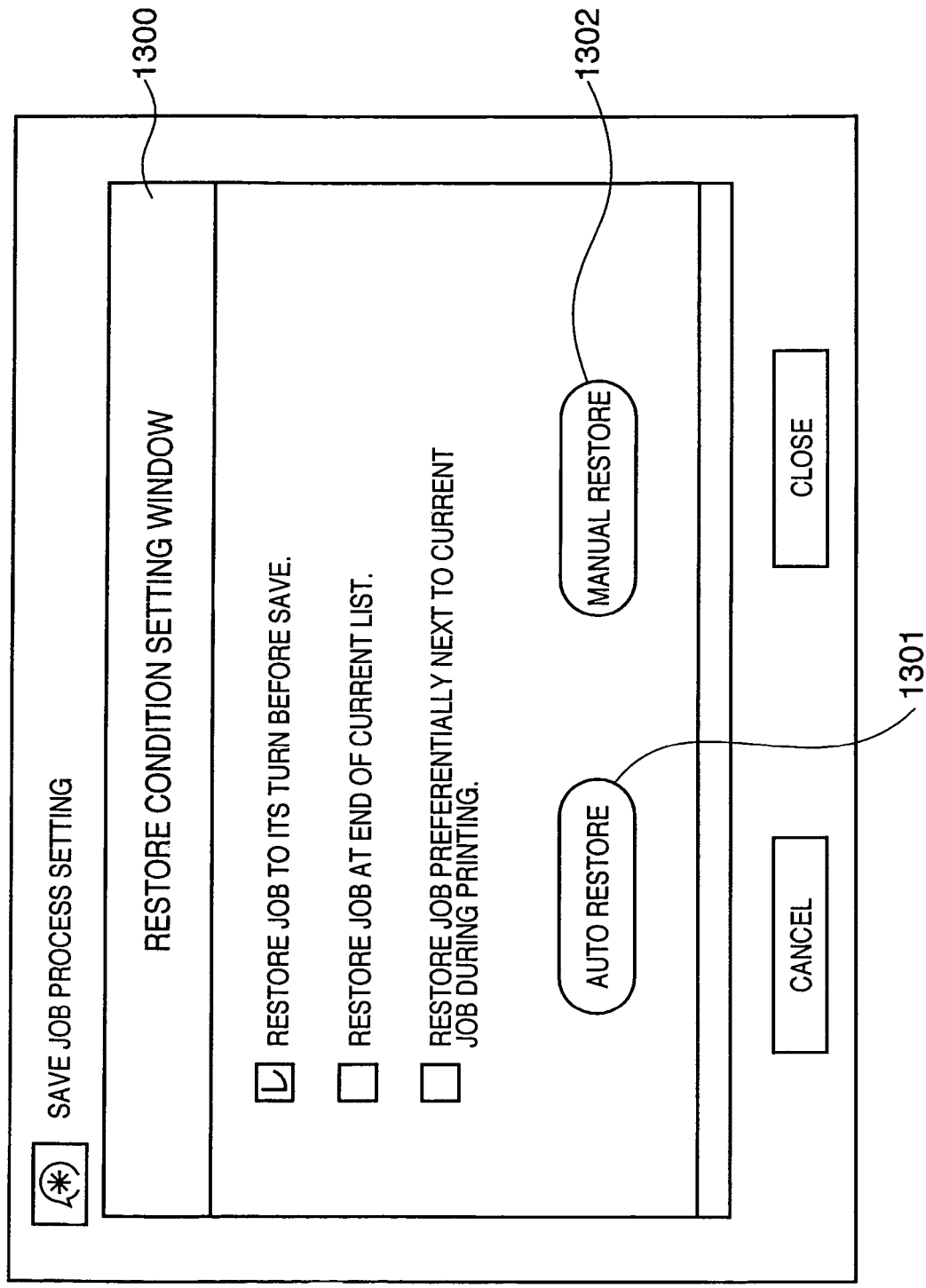
FIG. 13 is a view showing an example of a restore condition setting window according to the embodiment of the present invention.

When the restore condition setting button 1013 is pressed in the save job process setting window 1010, a restore condition setting window 1300 shown in FIG. 13 is displayed. The restore condition setting window 1300 allows setting a condition to resume printing of a temporarily saved job.

A plurality of setting items are prepared as setting items of the restore condition setting window 1300, and each setting item can be selected with a check box control. That is, an arbitrary combination of setting items can be simultaneously set with check box controls.

As shown in FIG. 13, an example of the setting items is "restore a job to its turn before save." This means that, when printing of a job saved in the document management unit 111 resumes, the job is restored to its turn before save.

In FIG. 13, setting items for restoring a temporarily saved job at the end of the current job list, or restoring the job so as to print it preferentially next to a job during printing are prepared in addition to the setting item "restore a job to its turn before save." These setting items are merely examples, and various setting items can be prepared in accordance with the application purpose.

The restore condition setting window 1300 allows setting, as a restore condition, whether to automatically resume a printing process for a job when resources necessary for the printing apparatus ate set, or resume the printing process when resume of printing is manually designated. This setting can be realized by operating an "auto restore" button 1301 or "manual restore" button 1302. In FIG. 13, the "manual restore" button 1302 is designated.

Note that pieces of setting information (display setting, save condition setting, and restore condition setting) set in various setting windows shown in FIGS. 11 to 13 are stored in, e.g., the resource management unit 112, and read out, as needed.

A window for confirming the save job status will be explained with reference to FIG. 14.

Figure 14:
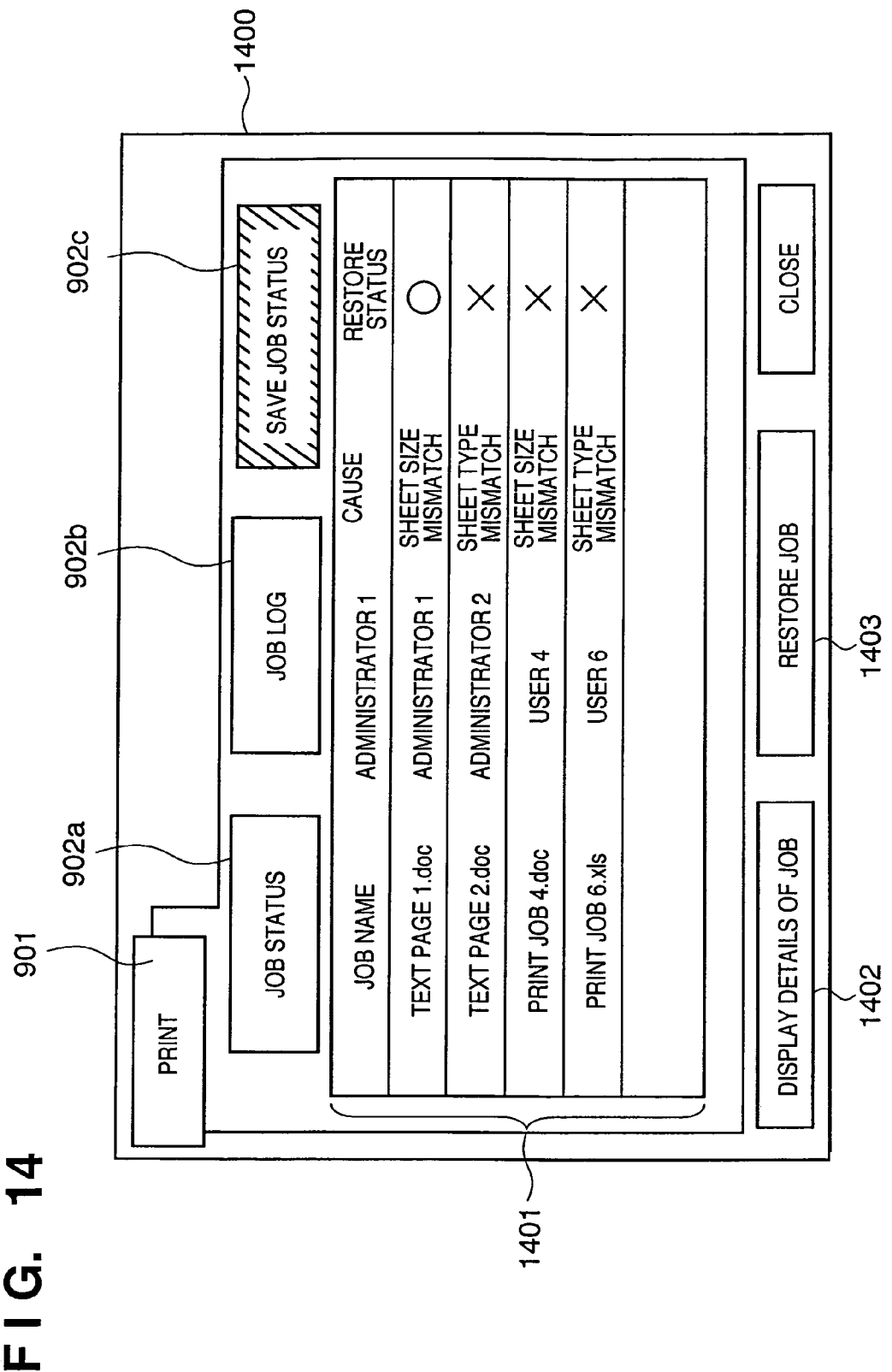
FIG. 14 is a view showing an example of a save job status window according to the embodiment of the present invention.

FIG. 14 is a view showing an example of the save job status window according to the embodiment of the present invention.

A save job status window 1400 shown in FIG. 14 is displayed when the save job status button 902c in the job status window of FIG. 9A is pressed. The save job status window 1400 displays a save job list 1401 serving as a job list of jobs temporarily saved in the document management unit 111. The save job list 1401 displays job information on each job, such as the job name, job administrator, printing interruption cause, and restorable status.

When the restore status of a job in the job list is ○ (restorable), a "restore job" button 1403 is pressed while the job is selected. With this operation, the temporarily interrupted job can be restored to manually resume printing of the job. If automatic restore is designated as the restore condition, printing of a target job resumes after the job is restored.

Figure 15:
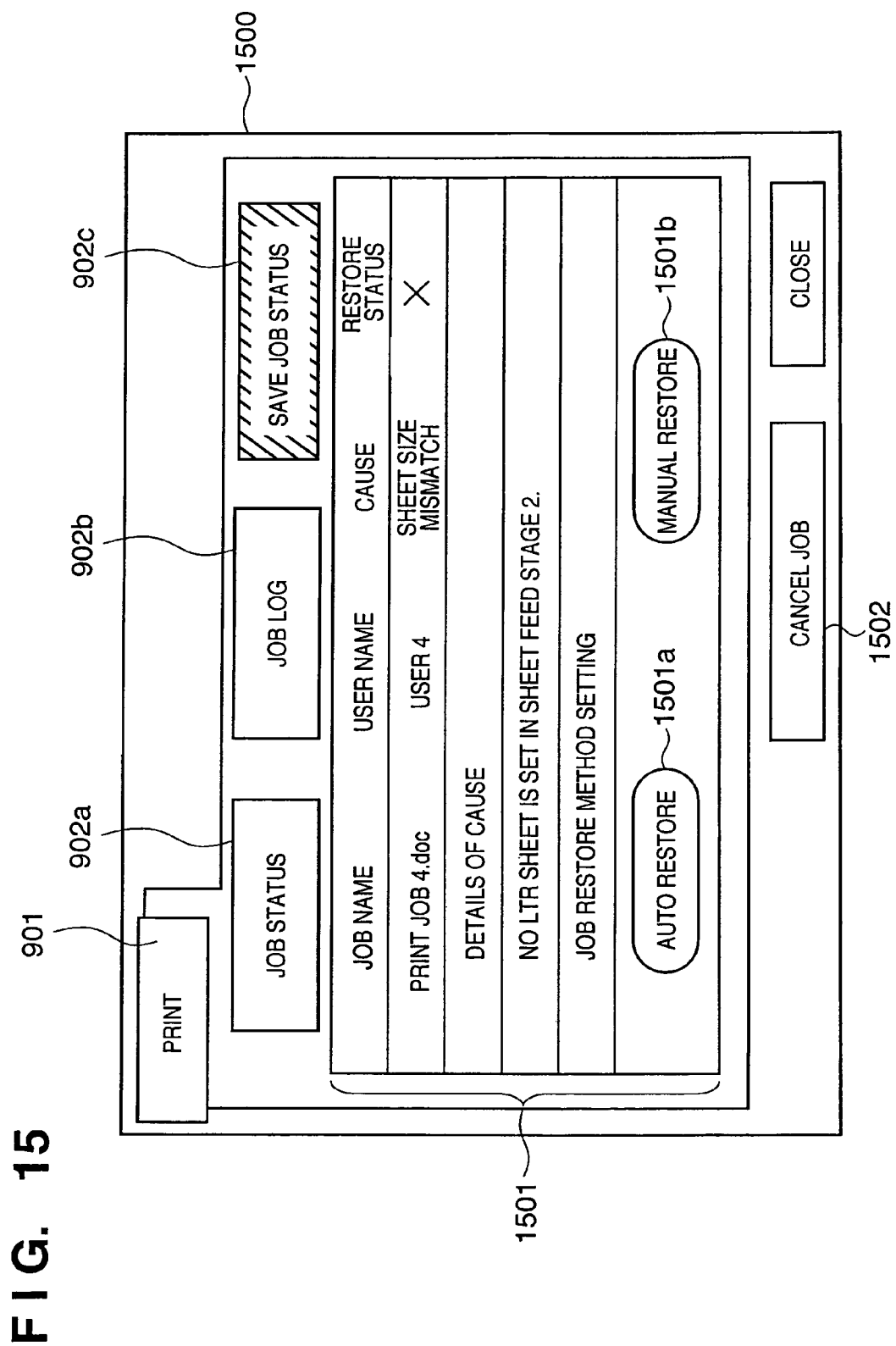
FIG. 15 is a view showing an example of a save job detail display window according to the embodiment of the present invention.

When a detail display button 1402 is pressed while an arbitrary job in the save job list 1401 displayed in the save job status window 1400 is selected, a save job detail display window shown in FIG. 15 is displayed.

A save job detail display window 1500 displays detailed information 1501 which shows the job name of a selected job, the user name, the printing interruption cause, and the restore status, shows details of the interruption cause, and represents how to set the printing apparatus in order to restore the job.

As a method of restoring a temporarily saved job, whether to automatically or manually restore the job can be selected. This selection is implementing by operating an "auto restore" button 1501a or "manual restore" button 1501b. In FIG. 15, the "manual restore" button 1501b is designated.

By pressing a "cancel job" button 1502, printing of a temporarily saved job can be canceled.

A printing process by the MFP will be explained with reference to FIG. 16.

Figure 16:
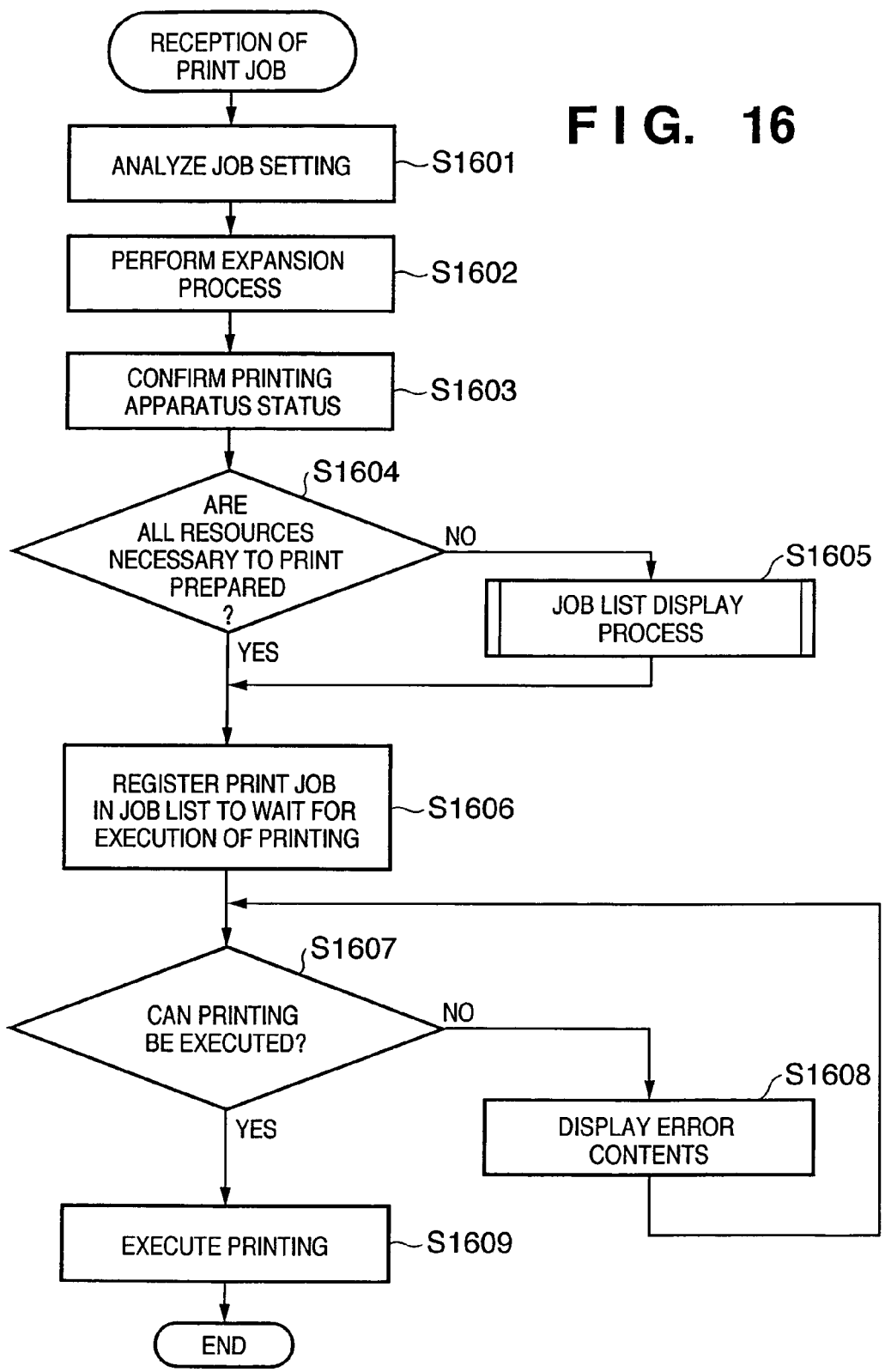
FIG. 16 is a flowchart showing a printing process according to the embodiment of the present invention.

FIG. 16 is a flowchart showing the printing process according to the embodiment of the present invention.

Note that the printing process is implemented under the control of the MFP control unit 106.

After a print job is received, job setting information is analyzed by the job analysis unit 203a (step S1601). After the end of analyzing the job setting information, image data is expanded by the RIP unit 108 on the basis of the analyzed job setting information (step S1602).

Upon completion of the expansion process, the MFP control unit 106 confirms the printing apparatus status (step S1603). Based on the confirmation result, the MFP control unit 106 determines whether all resources necessary to print a target print job are prepared in the printing apparatus (step S1604). If not all necessary resources are prepared (NO in step S1604), the MFP control unit 106 determines that an error (printing cannot be executed) occurs in the job, and executes a job list display process (step S1605). If all necessary resources are prepared (YES in step S1604), the MFP control unit 106 registers the print job in the job list to wait for execution of printing (step S1606).

The print job registered in the job list waits until its turn for printing comes. If the turn for printing comes, the MFP control unit 106 determines whether printing can be executed (step S1607). If printing can be executed (YES in step S1607), the MFP control unit 106 causes the printer unit 113 to print the print job (step S1609).

If no printing can be executed (NO in step S1607), the MFP control unit 106 displays error contents to this effect on the operation unit 107 (step S1608). For the job in the error status, the error contents are kept displayed until the error is canceled. Note that the error contents may be displayed in, e.g., a dedicated dialog. Alternatively, information representing the error status may be displayed at the item "status" of the job list 902 in the job status window 900 of FIG. 9A.

If the error is canceled and printing becomes executable, the MFP control unit 106 causes the printer unit 113 to print (step S1609). Then, the printing process ends.

If no error is canceled even upon the lapse of a predetermined time, a corresponding job may be saved as a save job in the document management unit 111.

Details of the job list display process in step S1605 will be explained with reference to FIG. 17.

Figure 17:
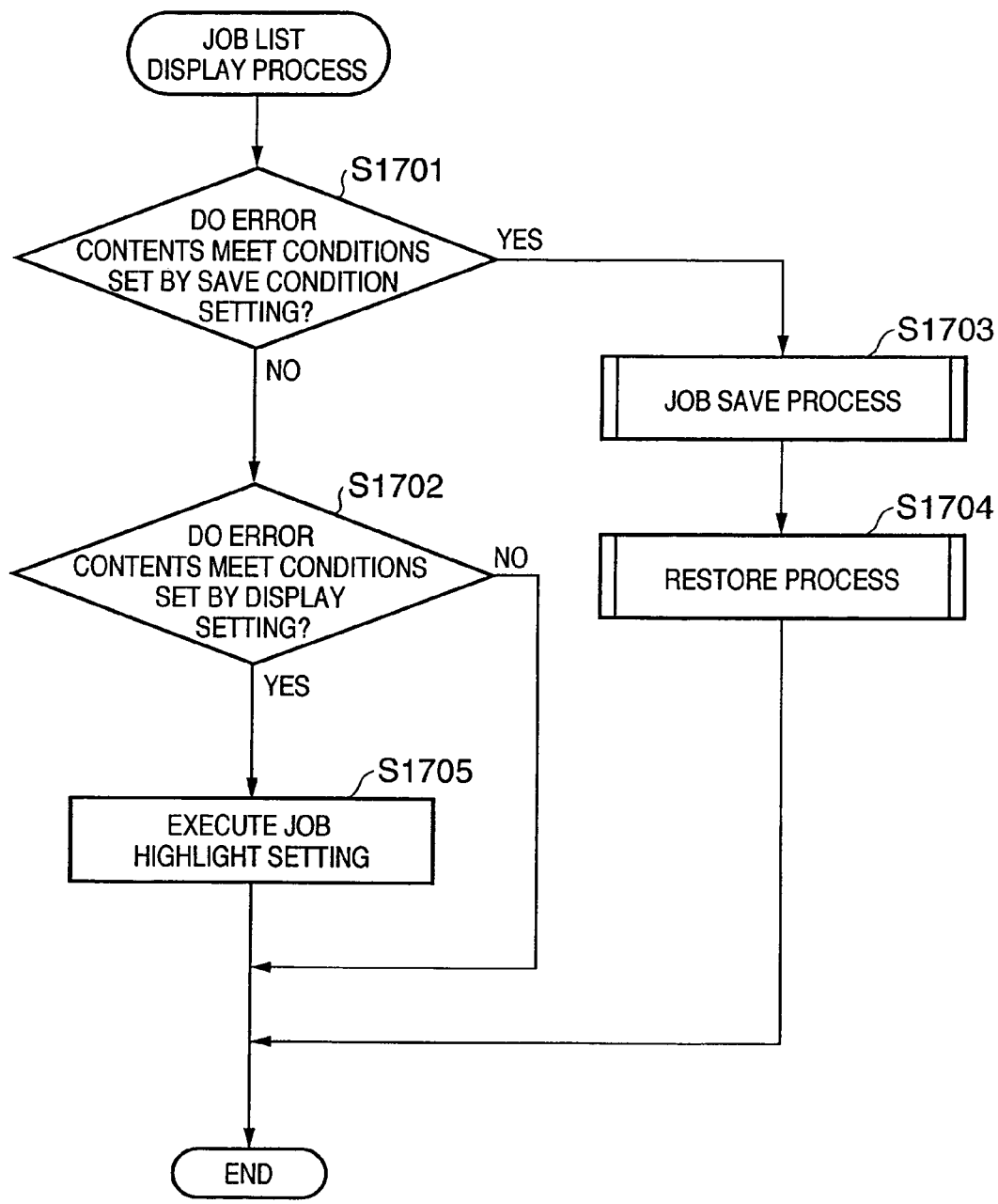
FIG. 17 is a flowchart showing details of a job list display process according to the embodiment of the present invention.

FIG. 17 is a flowchart showing details of the job list display process according to the embodiment of the present invention.

If not all resources necessary to execute printing are prepared in step S1604 of FIG. 16, the MFP control unit 106 executes the job list display process. First, the MFP control unit 106 determines whether conditions set by save condition setting coincide with the error contents of a job to be processed (step S1701). If the conditions coincide with the error contents (YES in step S1701), the MFP control unit 106 executes a job save process (step S1703) and a restore process (step S1704).

If the conditions do not coincide with the error contents (NO in step S1701), the MFP control unit 106 determines whether conditions set by display setting coincide with the error contents of the job to be processed (step S1702). If the conditions do not coincide with the error contents (NO in step S1702), the MFP control unit 106 ends the job list display process. If the conditions coincide with the error contents (YES in step S1702), the MFP control unit 106 executes job highlight setting (step S1705). Thereafter, the MFP control unit 106 ends the job list display process.

When the "save selected job" button 903 is operated while an arbitrary job is selected in the job list 902 in the job status window 900 of FIG. 9A, the save process and restore process for the selected job are executed upon the operation.

When the error contents of a job to be processed meet conditions set by save condition setting in the process of FIG. 17, the job is saved in the document management unit 111 without registering the job in the job list 902. By this procedure, a subsequent job free from any error can continue.

When the error contents of a job to be processed do not meet conditions set by save condition setting but meet conditions set by display setting, the job is registered in the job list 902 and highlighted. In this case, the job is not deleted from the job list 902. If no printing can be executed even in the process of step S1607, the flow shifts to step S1608.

When the error contents of a job to be processed do not meet conditions set by either save condition setting or conditions set by display setting, the job is registered in the job list 902 and displayed in a normal state. In this case, the job is not deleted from the job list 902. If no printing can be executed in the process of step S1607, the flow shifts to step S1608.

Details of the save process and restore process in steps S1703 and S1704 will be explained with reference to FIG. 18.

Figure 18:
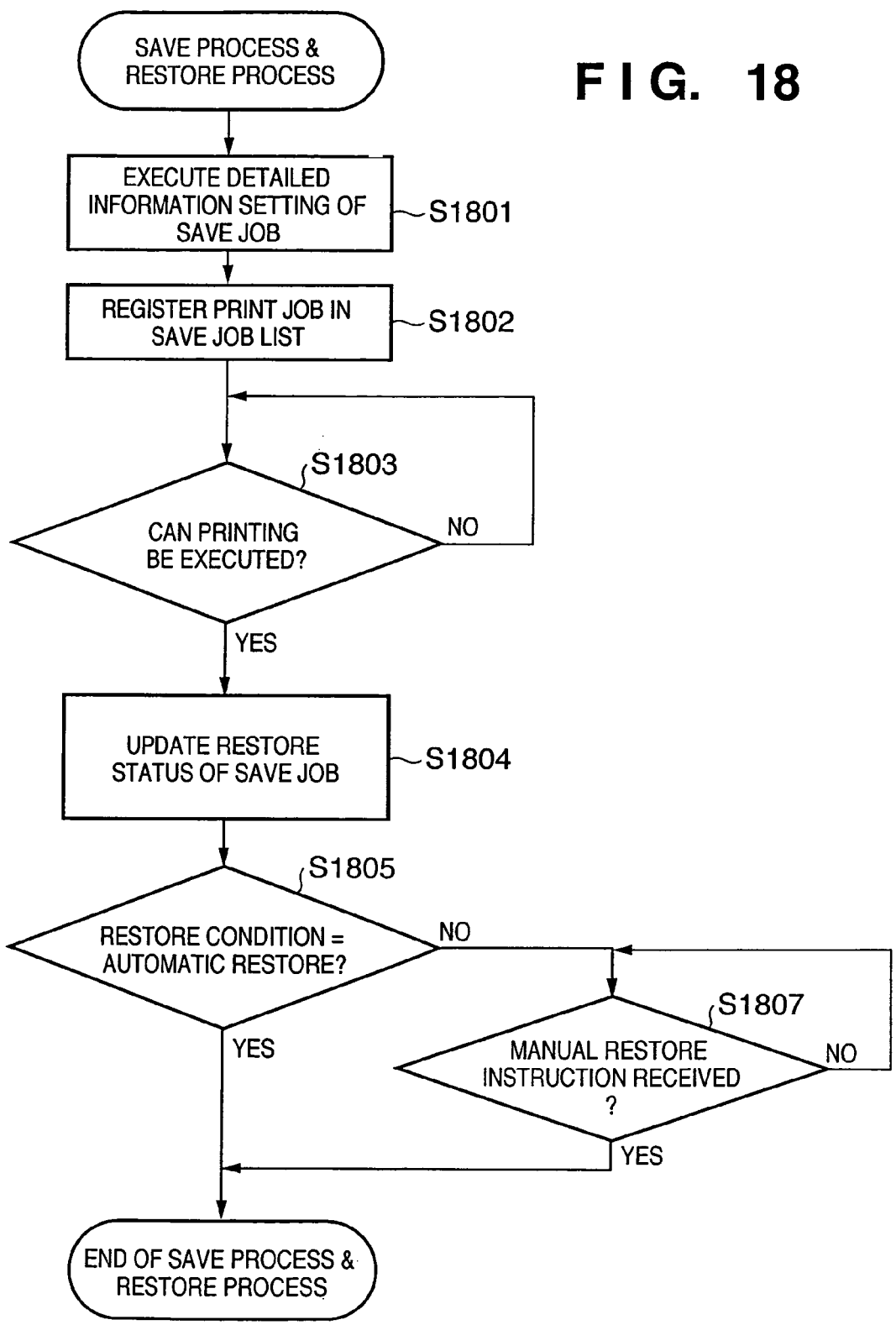
FIG. 18 is a flowchart showing details of a save process and restore process according to the embodiment of the present invention.

FIG. 18 is a flowchart showing details of the save process and restore process according to the embodiment of the present invention.

If the error contents of a print job meet conditions set by save condition setting in step S1701 of FIG. 17 (or the "save selected job" button 903 is operated), the MFP control unit 106 executes detailed information setting of a job to be saved (save job) (step S1801). Detailed information setting is a process of generating the detailed information 1501 displayed in the save job detail display window 1500 of FIG. 15.

The MPP control unit 106 temporarily saves the print job in the document management unit 111, and at the same time, registers the print job as a save job in the save job list (step S1802).

For save jobs in the save job list, the MFP control unit 106 sequentially determines whether printing can be executed (step S1803). If no printing can be executed (NO in step S1803), the MFP control unit 106 waits until printing becomes executable.

If printing can be executed (YES in step S1803), the MFP control unit 106 updates the restore status of the save job to a restorable state (step S1804). This update is reflected in the restore status in the save job status window 1400.

If a restorable job exists, the MFP control unit 106 determines whether the restore condition setting of the job is automatic restore (step S1805). If the restore condition setting is automatic restore (YES in step S1805), the MFP control unit 106 ends the restore process. After that, the job is registered in the job list to wait for execution of printing (step S1606 in FIG. 16).

If the restore condition setting is not automatic restore (NO in step S1805), i.e., is manual restore, the MFP control unit 106 waits until a restore instruction is manually issued (step S1807). The restore instruction is issued when the "restore job" button 1403 in the save job status window 1400 is pressed.

If no restore instruction is issued (NO in step S1807), the MFP control unit 106 waits until the restore instruction is issued. If the restore instruction is issued (YES in step S1807), the MFP control unit 106 ends the restore process. Then, the job is registered in the job list to wait for execution of printing.

As described above, according to the embodiment, when printing interrupts before the start of an arbitrary job or during printing, the job is temporarily saved, and printing of a subsequent job can continue. Since printing of the subsequent print job can start, the downtime during which a printing process by the printing apparatus is interrupted can be minimized. At this time, a condition to temporarily save a job can be arbitrarily set, and a printing process optimal for the printing apparatus and job status including the method of restoring a temporarily interrupted job can be performed.

In this manner, the embodiment provides a system having a printing apparatus which can accept a plurality of job data (including document data and print condition data of the document) by using a storage unit such as a hard disk.

In this configuration, the printing apparatus (or printing system) is configured to be controlled by the control unit so as to execute, e.g., various operations to be described below. Note that the control unit controls to execute operations based on various user instructions input via a user interface unit (to be referred to as a UI unit hereinafter) according to the embodiment.

The UI unit utilizes the display unit of the operation unit of the printing apparatus itself. Alternatively, the UI unit may utilize the display unit of an external device such as a host computer or another printing apparatus that can communicate data with the printing apparatus. In either arrangement, the UI unit is configured to input various user instructions according to the embodiment via the UI unit.

For example, the control unit controls the printing apparatus to execute, at a timing based on a user instruction input via the UI unit, a printing process for a job which waits for the printing process due to an interruption factor generated in the printing apparatus.

The control unit preferably controls the printing apparatus to execute, at a timing based on a user instruction, a printing process for a job designated by the user among a plurality of jobs which wait for the printing process due to an interruption factor generated in the printing apparatus.

The control unit preferably controls the printing apparatus to successively execute, at a timing based on a user instruction, a printing process at once for a plurality of jobs designated by the user among a plurality of jobs which wait for the printing process due to an interruption factor generated in the printing apparatus.

When a printing interruption factor is generated in the printing apparatus, the control unit controls to save a job which cannot be completely printed due to the printing interruption factor, and to execute a printing process for a job free from the influence of the interruption factor at a timing when printing can be executed by the printing apparatus.

When a printing interruption factor is generated in the printing apparatus, the control unit preferably controls to save a plurality of jobs which are influenced by the printing interruption factor and wait for printing, so as to discriminate these jobs from print jobs free from the influence of the interruption factor.

The control unit more preferably allows the user via the UI unit to select a desired mode from a mode in which a printing process for a saved print job is automatically executed when printing by the printing apparatus becomes executable, and a mode in which no printing process is executed without any instruction from the user even after printing by the printing apparatus becomes executable. The control unit controls the printing apparatus to execute an operation in the selected mode.

By adopting the above-described mechanisms, various effects to be described below can be attained.

For example, even a situation assumed in Description of the Related Art can be flexibly coped with. For example, even when an error occurs in the printing apparatus, the printing apparatus can efficiently continue a printing process. The configuration is not limited to only one that processes a job efficiently when viewed from the apparatus or system.

For example, even if an error factor is generated in the printing apparatus, a plurality of jobs can be smoothly processed by scheduling convenient to even the operator who operates the apparatus and system while high productivity is achieved. A convenient, user-friendly system environment can be constructed in which various needs from various users can be flexibly met in accordance with an actual site such as the POD environment.

In the process of FIG. 16, whether the job to be processed satisfies save conditions is determined in the job display process of step S1605, but the determination is not limited to this. For example, after the job to be processed is temporarily registered in the job list and it is determined in step S1607 that no printing can be executed, whether the job satisfies save conditions may be determined.

This configuration considers a situation in which the user can cancel an error such as absence of sheets within a relatively short time. If an error is canceled by determination in step S1607 after determination in step S1604, it can be expected to execute printing without saving the job.

As the printing interruption factor, there are various factors. For example, consumables such as printing toner and staples necessary for a print job by the printing apparatus run out. Other printing interruption factors are failures, troubles, and the like in the apparatus, such as a finishing error by the finisher, a sheet jam in the printer unit, and a document jam in the ADF. The control unit supports even these printing interruption factors, and applies various control operations in the embodiment.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Application No. 2005-249947, filed Aug. 30, 2005, which is hereby incorporated by reference herein in its entirety.

What is claimed is:

1. A printing apparatus, comprising:
an input unit constructed to input a print job;
an apparatus status confirmation unit constructed to confirm that a resource necessary to print the print job input by the input unit is prepared in the printing apparatus;
a registration unit constructed to register the print job in a wait job list when the resource necessary to print the print job is confirmed by the apparatus status confirmation unit, and register the print job as a saved job when the resource necessary to print the print job is not confirmed by the apparatus status confirmation unit;
an execution unit constructed to execute print jobs registered in the wait job list;
a setting unit constructed to set a restore condition for restoring the saved job into the wait job list,
wherein the restore condition is selected from a plurality of restore conditions including a first restore condition which restores the saved job after a print job which is to be executed last in a plurality of print jobs registered in the wait job list, and a second restore condition which restores the saved job before a print job which is to be executed last in a plurality of print jobs registered in the wait job list, and
wherein when the resource necessary to print the saved job is set in the printing apparatus, the registration unit registers the saved job, in the wait job list on the basis of the restore condition set by the setting unit, so as to execute the saved job by the execution unit according to the wait job list.

2. The apparatus according to claim 1, wherein the plurality of restore conditions further includes a third restore condition which restores the saved job in the wait job list next to a current print job that is being printed when a resource necessary to print the print job registered as the saved job is set in the printing apparatus.

3. The apparatus according to claim 1, further comprising a save condition setting unit constructed to set a save condition for registering the print job input by the input unit as the saved job,
wherein the registration unit registers the print job input by the input unit as the saved job on the basis of the save condition.

4. The apparatus according to claim 1, further comprising:
a display unit constructed to display a list of a print jobs input by the input unit; and
a display condition setting unit constructed to make setting of a display condition for displaying the list of the print jobs,
wherein the display unit displays the list of the print jobs on the basis of the display condition.

5. The apparatus according to claim 1, wherein when a resource necessary to print the print job registered as the saved job is set in the printing apparatus, the registration unit automatically registers the print job registered as the saved job, in the wait job list, so as to print the print job registered as the saved job according to the restore condition set by the setting unit.

6. The apparatus according to claim 1, wherein when a resource necessary to print the print job registered as the saved job is set in the printing apparatus, the registration unit registers the print job registered as the saved job, in the wait job list according to a user instruction, so as to print the print job registered as the saved job according to the restore condition set by the setting unit.

7. A printing method, comprising:
an input step of inputting a print job;
an apparatus status confirmation step of confirming that a resource necessary to print the print job input in the input step is prepared in a printing apparatus;
a registration step of registering by the printing apparatus the print job in a wait job list when the resource necessary to print the print job is confirmed by the apparatus status confirmation step, and registering the print job as a saved job when the resource necessary to print the print job is not confirmed in the apparatus status confirmation step;
an execution step constructed to execute print jobs registered in the wait job list;
a setting step of setting a restore condition for restoring the saved job into the wait job list,
wherein the restore condition is selected from a plurality of restore conditions, including a first restore condition which restores the saved job after a print job which is to be executed last in a plurality of print jobs registered in the wait job list, and a second restore condition which restores the saved job before a print job which is to be executed last in a plurality of print jobs registered in the wait job list,
wherein when the resource necessary to print the saved job is set in the printing apparatus, the registration step registers the saved job, in the wait job list on the basis of the restore condition set in the setting set, so as to execute the saved job by the execution step according to the wait job list.

8. A non-transitory computer-readable storage medium storing a computer-executable program for a method for controlling a printing apparatus, the method comprising:
an input step of inputting a print job;
an apparatus status confirmation step of confirming that a resource necessary to print the print job input in the input step is prepared in the printing apparatus;
a registration step of registering the print job in a wait job list when the resource necessary to print the print job is confirmed by the apparatus status confirmation step, and registering the print job as a saved job when the resource necessary to print the print job is not confirmed in the apparatus status confirmation step;
an execution step constructed to execute print jobs registered in the wait job list;
a setting step of setting a restore condition for restoring the saved job into the wait job list,
wherein the restore condition is selected from a plurality of restore conditions, including a first restore condition which restores the saved job after a print job which is to be executed last in a plurality of print jobs registered in the wait job list, and a second restore condition which restores the saved job before a print job which is to be executed last in a plurality of print jobs registered in the wait job list,
wherein when the resource necessary to print the saved job is set in the printing apparatus, the registration step registers the saved job, in the wait job list on the basis of the restore condition set in the setting set, so as to execute the saved job by the execution step according to the wait job list.

* * * * *